US012570797B2

(12) United States Patent
Okkel et al.

(10) Patent No.: US 12,570,797 B2
(45) Date of Patent: Mar. 10, 2026

(54) ACID FUNCTIONAL COMPOUND

(71) Applicant: BYK-Chemie GmbH, Wesel (DE)

(72) Inventors: Andreas Okkel, Wesel (DE); Irina Giebelhaus, Wesel (DE); Guillaume Wojciech Jaunky, Wesel (DE); Markus Lorenz, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 1006 days.

(21) Appl. No.: 16/635,846

(22) PCT Filed: Aug. 7, 2018

(86) PCT No.: PCT/EP2018/071398

§ 371 (c)(1),
(2) Date: Jan. 31, 2020

(87) PCT Pub. No.: WO2019/030228

PCT Pub. Date: Feb. 14, 2019

(65) Prior Publication Data

US 2020/0392286 A1 Dec. 17, 2020

(30) Foreign Application Priority Data

Aug. 8, 2017 (EP) .................................... 17185302

(51) Int. Cl.

| | |
|---|---|
| ***C08G 65/26*** | (2006.01) |
| ***C08G 63/48*** | (2006.01) |
| ***C08G 63/685*** | (2006.01) |
| ***C08G 65/327*** | (2006.01) |
| ***C08G 65/332*** | (2006.01) |
| ***C09D 11/322*** | (2014.01) |
| ***C09D 11/326*** | (2014.01) |
| ***C09D 11/38*** | (2014.01) |
| ***C09D 167/00*** | (2006.01) |
| ***C09D 167/08*** | (2006.01) |

(52) U.S. Cl.

CPC ......... *C08G 65/2615* (2013.01); *C08G 63/48* (2013.01); *C08G 63/6852* (2013.01); *C08G 65/2609* (2013.01); *C08G 65/2624* (2013.01); *C08G 65/327* (2013.01); *C08G 65/3322* (2013.01); *C09D 11/322* (2013.01); *C09D 11/326* (2013.01); *C09D 11/38* (2013.01); *C09D 167/00* (2013.01); *C09D 167/08* (2013.01)

(58) Field of Classification Search

CPC ................ C08G 65/2615; C08G 63/48; C08G 63/6852; C08G 65/2609; C08G 65/2624; C08G 65/327; C08G 65/3322; C09D 11/322; C09D 11/326; C09D 11/38; C09D 167/00; C09D 167/08

See application file for complete search history.

(56) References Cited

U.S. PATENT DOCUMENTS

| | | | |
|---|---|---|---|
| 3,682,865 A | 8/1972 | Jenkins | |
| 3,689,531 A | 9/1972 | Critchfield et al. | |
| 4,777,195 A | 10/1988 | Hesse et al. | |
| 4,795,796 A | 1/1989 | Haubennestel et al. | |
| 4,939,283 A * | 7/1990 | Yokota .................. | C07C 305/00 558/186 |
| 6,111,054 A | 8/2000 | Haubennestel et al. | |
| 7,312,260 B2 | 12/2007 | Krappe | |
| 8,653,222 B2 | 2/2014 | Orth | |
| 9,206,347 B2 | 12/2015 | Weerasooriya | |
| 9,217,083 B2 | 12/2015 | Hans | |
| 9,340,641 B2 | 5/2016 | Orth | |
| 9,580,616 B2 | 2/2017 | Fornara et al. | |
| 10,301,486 B2 | 5/2019 | Göbelt | |
| 2003/0027873 A1 | 2/2003 | Thetford | |
| 2005/0020735 A1 | 1/2005 | Krappe | |
| 2005/0250927 A1 | 11/2005 | Pritschins | |
| 2006/0089426 A1 | 4/2006 | Haubennestel | |
| 2010/0298490 A1 | 11/2010 | Caiozzo | |
| 2012/0059088 A1 | 3/2012 | Hilfiger et al. | |
| 2013/0231418 A1 | 9/2013 | Hilfiger | |
| 2017/0190840 A1 | 7/2017 | Gobelt et al. | |
| 2017/0233660 A1 | 8/2017 | Soane | |

FOREIGN PATENT DOCUMENTS

| | | |
|---|---|---|
| EP | 0270126 A2 | 6/1988 |
| EP | 0893155 A1 | 1/1999 |
| EP | 1486524 | 12/2004 |
| EP | 1745104 | 1/2007 |
| EP | 1916273 | 4/2008 |
| EP | 3622001 | 3/2020 |

(Continued)

OTHER PUBLICATIONS https://www.merriam-webster.com/dictionary/random.*

(Continued)

*Primary Examiner* — Jessica Worsham

(74) *Attorney, Agent, or Firm* — Fitch, Even, Tabin & Flannery LLP

(57) ABSTRACT

The invention relates to an acid functional compound comprising i. at least one segment consisting of at least one ether unit E and at least one ester unit, wherein the ether units and ester units are connected by an ether link or by an ester link, and wherein the sum of the number of ether units and ester units is at least three, and wherein the ether units and ester units are arranged in random order, and ii. at least one acidic group which is selected from the group consisting of a phosphoric acid group, an acidic phosphoric acid ester group, a sulfonic acid group, an acidic sulfonic acid ester group and a carboxylic acid group, wherein the at least one acidic group is covalently linked to the at least one segment.

19 Claims, No Drawings

(56) References Cited

FOREIGN PATENT DOCUMENTS

| | | | |
|---|---|---|---|
| GB | 2562172 | | 11/2018 |
| JP | H0431471 | | 2/1992 |
| JP | 2000512795 | | 9/2000 |
| JP | 2009256583 | | 11/2009 |
| JP | 2010189515 | | 9/2010 |
| JP | 2011224562 | | 11/2011 |
| JP | 5093112 | | 12/2012 |
| WO | 9534593 | A1 | 12/1995 |
| WO | 9719948 | A1 | 6/1997 |
| WO | 9955763 | A1 | 11/1999 |
| WO | 2008092687 | | 8/2008 |
| WO | 2008116932 | A1 | 10/2008 |
| WO | 2009081528 | A1 | 7/2009 |
| WO | 2011070074 | | 6/2011 |
| WO | 2012049186 | | 4/2012 |
| WO | 2016059066 | | 4/2016 |
| WO | 2018203035 | | 11/2018 |
| WO | 2020057933 | A1 | 3/2020 |

OTHER PUBLICATIONS http://chrysler.org/the-history-of-art-in-colors-brown/#:~:text=Asphaltum%20is%20a%20pigment%20made,term%20was%20indistinguishable%20from%20'bitumen, May 27, 2020 (Year: 2020).

Huntsman, "Technical Bulletin Jeffamine M-600 Polyetheramine," pp. 1-2, copyright 2008 (Year: 2008).

Huntsman, "Technical Bulletin Jeffamine M-1000 Polyetheramine," pp. 1-2, copyright 2007 (Year: 2007).

International Search Report and Written Opinion for International Application No. PCT/EP2018/071398 dated Sep. 14, 2018.

International Search Report and Written Opinion for International Application No. PCT/EP2018/071404 dated Sep. 14, 2018.

Third-Party Observations for European Application No. 18746731.1 mailed on Mar. 29, 2023.

Gao et al. Review on synthesis of polyether-co-polyester from copolymerization of epoxides and lactones. CIESC Journal, 2021, 72 (1 ), 440-451. (Year: 2021).

Grenda et al. An analytical approach to elucidate the architecture of polyethyleneimines. J. Appl. Poly. Sci. 2022, 139(7), e51657. 2021. (Year: 2021).

Machine Translation of Gao et al. Review on synthesis of polyether-co-polyester from copolymerization of epoxides and lactones. CIESC Journal, 2021, 72(1), 440-451. (Year: 2021).

Nippon Shokubai Co., Ltd. , Epomin Polyment brochure, https://www.shokubai.co.jp/ja/products/detail/epomin1.html>, (2013), p. 1-10.

S. Koltzenburg et al.; "Copolymerisation"; Polymere: Synthese, Eigenschaften und Anwendungen; Springer-Verlag Berlin Heidelberg 2014 (with partial English translation of section 13.11 only), pp. 368-399.

* cited by examiner

ACID FUNCTIONAL COMPOUND

FIELD OF THE INVENTION

The present invention relates to an acid functional compound, to the method for producing the acid functional compound, to the use of the acid functional compound and to a composition comprising the acid functional compound.

BACKGROUND OF THE INVENTION

Wetting agents which are present in a liquid in dissolved or dispersed form, reduce the surface tension or the interfacial tension, and thus increase the wetting capacity of the liquid. In this way, wetting agents permit a surface to be readily wetted by a liquid. Dispersants are suitable in general for stabilizing solid particles in binders, paints, coatings, pigment pastes, plastics and plastic blends, adhesives and sealing compounds, for reducing the viscosity of corresponding systems and for improving the flow properties. High mechanical forces are necessary in order to be able to introduce solids into liquid media. It is customary to use dispersants to reduce the dispersing forces and to minimize the total energy input into the system, which is required for deflocculation of solid particles and thus also to minimize the dispersing time. Dispersants of this kind are surface-active substances of anionic, cationic and/or neutral structure. These substances, in a small amount, are either applied directly to the solid or are added to the dispersing medium. It is also known that, following complete deflocculation of the agglomerated solids into primary particles, after the dispersing operation, there are also instances of reagglomeration, thereby completely or partly nullifying the dispersing effort.

As a result of inadequate dispersion and/or reagglomeration, unwanted effects typically occur, such as color drift, an increase in viscosity in liquid systems and a loss of gloss in paints and coatings as well as a reduction in the mechanical strength and material homogeneity in plastics.

In practice, various types of compounds maybe considered for use as wetting agents and dispersants. This is due in particular to the fact that there exist a number of different types of systems, which are based in particular on a wide variety of binders with different particles to be dispersed, such as pigments, fillers and fibers. In connection with the dispersion of inorganic pigments and fillers often dispersants containing acidic groups like phosphoric acid groups, phosphoric acid ester groups, sulfonic acid groups, sulfonic acid ester groups and carboxylic groups provide good results.

WO 95/34593 relates to a dispersant, which is obtainable by reaction of polyethylene glycol with a lactone and an alkylene oxide to form a polymeric diol and phosphating said diol to form a phosphate ester: the obtained dispersant has a block like structure, wherein the alkylene oxide based segments and the lactone based segments are arranged in a block-like fashion. These dispersants show satisfactory dispersion stabilization in connection with inorganic particles but represent only partial solutions.

U.S. Pat. No. 3,689,531 relates to the manufacture of polymeric products, which result from the polymerization of an admixture containing lactones, alkylene oxides, and an organic monohydroxyl initiator, using potassium hydroxide as the catalyst therefor. The resulting linear block copolymers have hydroxyl end groups, which are in embodiments converted to an ester group by esterification reaction with a monocarboxylic acid or its corresponding anhydrides.

In view of the multiplicity of inorganic pigments that are nowadays used, sufficient stabilization is not sufficiently ensured and therefore there is still a need to further improve the performance of the dispersant.

It is an object of the present invention, therefore, to eliminate the above-described disadvantages of known state of the art dispersants, in other words to develop dispersants that provide an effective stabilization of solid particles and in particular for dispersing inorganic pigments.

SUMMARY OF THE INVENTION

In a first aspect the invention provides acid functional compound comprising i. at least one segment consisting of at least one ether unit E and at least one ester unit, wherein the ether units and ester units are connected by an ether link or by an ester link, and wherein the sum of the number of ether units and ester units is at least three, and wherein the ether units and ester units are arranged in random order, and
ii. at least one acidic group which is selected from the group consisting of a phosphoric acid group, an acidic phosphoric acid ester group, a sulfonic acid group, an acidic sulfonic acid ester group and a carboxylic acid group, wherein the at least one acidic group is covalently linked to the at least one segment.

In a further aspect the invention provides an acid functional compound comprising:

i. at least one segment consisting of at least one ether unit and at least one ester unit, which are connected to one another by an ether link or an ester link, wherein each segment is defined by the largest portion between two ester links and wherein the sum of the number of ether units and ester units is at least three, and wherein the at least one segment comprises an average number of ether links L between two adjacent ether units and an average number of ether units E, wherein a ratio R is defined according to formula (A):L/(E-1) and wherein, when E is larger than 1.0, R is smaller than 1.0, and, when E is equal to 1.0, L is larger than 0.0; and at least one acidic group ii. which is selected from the group consisting of a phosphoric acid group, an acidic phosphoric acid ester group, a sulfonic acid group, an acidic sulfonic acid ester group and a carboxylic acid group, wherein the at least one acidic group is covalently linked to the at least one segment.

The ether units (E) and ester units (S) of the at least one segment are connected to one another by an ether link or an ester link. The ether unit (E) may be formed by a ring-opening polymerisation reaction of a cyclic ether monomer, such as an oxirane monomer or an oxetane monomer. The ester unit (S) may be formed by a ring-opening polymerisation reaction of a cyclic ester monomer, such as a lactone monomer, such as propiolactone, valerolactone, butyrolactone, caprolactone, preferably epsilon-caprolactone.

An ether link is defined as an oxy bond, i.e. —O—. An ether link may be formed between two adjacent ether units and may be formed between an ether unit and an ester unit at the hydroxyl end position of an ester monomer. An ester link is defined as a carboxylate ester bond:

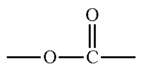

An ester link may be formed between two adjacent ester units and may be formed between an ether unit and an ester unit at the carboxylic end position of an ester monomer.

The at least one segment i. consists of at least one ether unit (E) and at least one ester unit (S), Each of the at least one segment i. has in total at least three units made up of at least one ether unit E and at least one ester unit S. Thus, the average number of ether units E of the at least one segment is at least 1.0. In case E is equal to 1.0, L needs to be larger than 0.0. In case E is larger than 1.0, the ratio R is smaller than 1.0.

The sequence of ether units and ester units in the segment is a basic aspect of the present invention. It is generally possible to provide corresponding block structures of ether units and ester units on the one hand but on the other hand it is possible to generate structures in which the structural units are more or less randomly copolymerized into the segment (such as random copolymer type). According to the present invention the segment should provide sequences of ester units and ether units, wherein the average number of ether links L between two adjacent ether units and the ratio R are provided as a quantitative measure how randomly ester units and ether units are arranged in the segment.

The ratio R according to formula (A) is based on the understanding that an average number of ether links L between two adjacent ether units is related to the (statistical or non-statistical) change of alternating an ether unit by an ester unit along the sequence. In case the sequence is formed by a two-block structure of a polyether block and a polyester block, the average number of ether links between two adjacent ether units L will be equal to the sum of the average number of ether units E in the segment minus one ether unit (i.e. E−1). Thus, for the two-block structure of a polyether block and a polyester block the ratio R is equal to 1.0 as L is equal to (E−1).

In case the segment has several sequences of ether units, which are interrupted by at least one ester unit, the average number of ether links L between two adjacent ether units will accordingly decrease, while the average number of ether units E in the segment may be held constant. As a result, the ratio R is accordingly below 1.0.

i.e. $R=L/(E-1)<1.0$

When the ratio R is smaller than 1.0, the acid functional compound provides enhanced properties, such as enhanced dispersion ability as dispersant. In particular, a dispersing stability of the acid functional compound at lower temperature may be improved as it shows less tendency towards crystallization. The enhanced properties of the acid functional compound may be an enhanced color, enhanced gloss and/or reduction of viscosity of the dispersion when using the acid functional compound as dispersant. Additionally, the handling of the acid functional compound in an additive composition is easier due to its low tendency towards crystallization.

The at least one acidic group ii. is selected from the group consisting of a phosphoric acid group, an acidic phosphoric acid ester group, a sulfonic acid group, an acidic sulfonic acid ester group and a carboxylic acid group. Each of these acidic groups is a Brnsted acid group capable of donating a proton.

It should be pointed out that the acid functional compounds according to the invention have a good dispersing effect with regard to a broad spectrum of solids to be dispersed. This is manifested in the fact that, among other things, not only solids having basic surfaces can be dispersed especially well, but also solids having neutral surfaces. The acid functional compounds according to the invention are thus of a particularly high quality and can be used universally as wetting agents and dispersants. In addition, especially in the case of pigment pastes, it is necessary to ensure a broad compatibility, in order to allow these pastes to be used in many different resins, binders, let down systems and coating materials. Furthermore, the acid functional compounds according to the invention permit flocculation-free applicability of the pastes, or of binders and coating materials produced with these pastes. In addition, the acid functional compounds according to the invention are suitable as dispersion stabilizers, in particular as emulsion stabilizers. The viscosity of the ground material added is definitely reduced during the dispersion as a result of the use of the acid functional compounds according to the invention, making it possible in this way to prepare formulations having a high solids content. The amount of (volatile) solvents can be reduced in this way to improve environmental safety. In summary, it can be concluded that the acid functional compounds according to the invention reduce the viscosity of ground materials of corresponding paints, pastes or plastic formulations while maintaining good stabilization of pigments or fillers to such an extent that processing is possible at high degrees of filling even without having a negative influence on the stability of the cured paints. Furthermore, the acid functional compounds according to the present invention provide good stabilization effects concerning matting agents leading to good matting properties. The matting of even solvent-free systems might be achieved (most matting agents are normally based on silica): High amounts of matting agents normally lead to high (and problematical) viscosities but the acid functional compounds according to the present invention reduce the viscosity and allow the use of higher amounts of matting agents. Finally, it should be pointed out that the acid functional compounds according to the invention can be prepared economically and are based on generally available starting materials.

Segment Units Order

In general, the more alternating the ether unit and the ester unit are arranged along the segment, the smaller the ratio R will be than 1.0 and closer the ratio R will be to 0.0. Typically, in case a mixture of segments is present in the acid functional compound, wherein in each segment the average number of ether units E is equal to one another (e.g. 4.0 ether units) and the average number of ether links L between two adjacent ether units is statistically distributed (i.e. between 0.0-3.0), the ratio R will be substantially equal to 0.5 (e.g. in the range 0.4-0.6).

Ultimately, in case each of the segments has a perfect alternating structure of ether units and ester units (e.g. T-S-T-S-structure), the average number of ether links L between two adjacent ether units is equal to 0.0 (as no ether links L are present). Thus the ratio R for the perfect alternating structure is equal to 0.0.

In an exemplary embodiment, the number of unit links of an ether unit to an adjacent ester unit is at least two, preferably at least three.

In an exemplary embodiment, the ratio R is smaller than 0.9, preferably R is smaller than 0.8, more preferably R is smaller than 0.7.

In an exemplary embodiment, the ratio R is substantially equal to 0.5. In this embodiment the ether units and ester units of the at least one segment are arranged in a random order. In case the ether units and ester units of the at least one segment are arranged in a random order, the ratio R will be substantially equal to 0.5. In case the molar ratio between the ether units and the ester units is equal to 1.0:1.0 and a chance of connecting an ester unit to an ether unit is substantially equal to the chance of connecting an ether unit to an ether unit during addition polymerization reaction of the segment, then the ratio R of the resulting segment is about 0.5. In particular, in this example a reaction rate for connecting an ester unit to an ether unit is substantially equal to a reaction rate for connecting an ether unit to an ether unit during addition polymerization reaction. In examples, by adjusting a molar ratio between the ether units and the ester units for the addition polymerization reaction of the segment, the ratio R of the segment may accordingly be tuned to be lower or higher than 0.5.

In an example, the ratio R is from 0.3 to 0.7, preferably the ratio R is from 0.4 to 0.6.

In an exemplary embodiment, the ratio R is substantially equal to 0.0. In this embodiment the ether units and the ester units of the at least one segment are arranged in a substantially alternating order. The ratio R is at least 0.0. In case a molar ratio between the ether units and the ester units is 1:1 and the ether units and the ester units of the at least one segment are arranged in a perfect alternating order, the ratio R is equal to 0.0. Additionally, also in case an ether unit is always alternated by one or more ester units, independently of the molar ratio between the ether units and the ester units, the ratio R is equal to 0.0. In all of these embodiments, the number of ether links L between two adjacent ether units of the at least one segment is equal to 0.0.

In an example, the ratio R is from 0.0 to 0.1.

Polymerization Starter Moiety.

In an exemplary embodiment, at least one segment is linked to a polymerization starter moiety comprising an amine group, which is selected from a tertiary amine group, a salt of a tertiary amine group and a quaternary ammonium group.

The polymerization starter moiety is a residue of a polymerization starter molecule used for starting the ring-opening polymerization of the ether units and the ester units to form the at least one segment i. The polymerization starter moiety comprises an amine group.

The polymerization starter moiety is covalently linked to the at least one segment i. The polymerization starter molecule (i.e. of a polymerization starter compound) is covalently linked to the segment i. after a functional group of the polymerization starter molecule has started the addition reaction of ether units and ester units thereby forming said at least one segment i. Examples of a functional group of the polymerization starter molecule for starting the addition reaction are a hydroxyl group, a primary amine group and a secondary amine group.

The polymerization starter compound may be represented by the general formula (IV):

$$Y(—X—H)_q,$$

wherein Y is represented by an organic group containing 1-500 carbon atoms, X is represented by O, NH and/or $NR^1$, and q=1-100. Normally $R^1$ is independently selected and is represented by a chemical bond to a carbon atom of Y and/or an independently selected organic group containing 1-20 carbon atoms.

In an exemplary embodiment, the polymerization starter moiety is directly linked to said at least one segment via one of the group consisting of an ether group, an ester group, a secondary amide group, a tertiary amide group, a secondary amine group and a tertiary amine group.

In an exemplary embodiment, the polymerization starter moiety comprises a polyethylenimine.

In an exemplary embodiment, the ether units are selected from the group consisting of the formula (III) $—[CR^{30}{}_2]_n—O—$, wherein n is an integer of 2 or 3, and $R^{30}$ independent of each other represent organic groups having 1 to 25 carbon atoms or hydrogen.

In a particular exemplary embodiment, wherein, in case n is equal to 2, at least one of the $R^{30}$ represents an ether group having the formula $—R^{31}—O—R^{32}$, wherein $R^{31}$ and $R^{32}$ independent of each other represent organic groups having 1 to 30 carbon atoms.

In an exemplary embodiment, an acidic group ii. is covalently linked to a segment i. via a linkage comprising an ester group selected from the group consisting of carboxylate ester group, a phosphoric ester group and a sulphonic ester group.

In an exemplary embodiment, the acid functional compound has the general formula:

$$Y(—X—W—Z)_q \text{ (Ia),}$$

wherein Y is represented by an organic group containing 1-500 carbon atoms, X is represented by O, NH and/or $NR^1$, with $R^1$ independently selected and represented by a chemical bond to a carbon atom of Y and/or an independently selected organic group containing 1-500 carbon atoms, W is a segment i., q=1-100, and Z is independent of each other selected to be a hydrogen or a moiety Z-a, which is independent of each other selected from an organic group containing 0-600 carbon atoms and at least one acidic group ii., wherein at least one Z is represented by Z-a.

In a particular exemplary embodiment, the moiety Z-a is independent of each other selected containing 0-500 carbon atoms, preferably 0-20 carbon atoms, and contains at least one acidic group which is selected from the group consisting of a phosphoric acid group and a phosphoric acid ester group.

In an exemplary embodiment, Z-a is independent of each other selected and is represented by the general formula (II)

$$\sim PO(V)_n(OH)_{2-n} \quad \text{(II)}$$

with

V is independently selected and represented by a chemical bond to an oxygen atom of the same molecule and/or a group $OR^{33}$ with $R^{33}$ independent of each other is represented by an organic group containing 1 to 500, preferably 1 to 35 carbon atoms, and n is represented by 0 or 1.

In a particular exemplary embodiment, n=0.

In an exemplary embodiment, the molar proportion of ester units to ether units in the at least one segment is 9:1-1:1. A higher amount of ester units provides a good compatibility of the amine functional compound to a dispersion system comprising particles. Moreover, the segment structures with a higher amount of ester units and having the specific ratio R as defined by the formula (A) enhance the desired technical effect.

In an exemplary embodiment, the acid functional compound is present in salinized or partially salinized form.

In another aspect of the present invention a use is provided of an acid functional compound according to the present invention as dispersing agent.

In another aspect of the present invention a use is provided of an acid functional compound according to the present invention as wetting agent.

In another aspect of the present invention a composition is provided comprising particles and an acid functional compound according to the present invention.

In another aspect of the present invention a method is provided for producing an acid functional compound according to the present invention, comprising the steps of:

a) preparing a segment by reacting a cyclic ester and a cyclic ether together in a ring-opening polymerization reaction, wherein the ring-opening polymerization reaction is started by a polymerization starter compound, which comprises at least one functional group selected from a hydroxyl group, a primary amine group and a secondary amine group, and b) converting the segment of step a) with an agent to covalently link at least one acidic group ii. to the segment, wherein the at least one acidic group ii. is selected from the group consisting of a phosphoric acid group, a phosphoric acid ester group, a sulfonic acid group, a sulfonic acid ester group and a carboxylic acid group.

The resulting acid functional compound has the features of the acid functional compound of the present invention.

In an exemplary embodiment, in step a) the polymerization starter compound comprises a polyethylenimine.

In an exemplary embodiment, in step a) the cyclic ester and the cyclic ether are added substantially simultaneously into a reaction mixture, which is maintained in reaction conditions.

The preparing of a segment by reacting a cyclic ester and a cyclic ether together in a ring-opening polymerization reaction may be carried out such that the ether units and ester units of the segment are arranged in random order. In an embodiment, the cyclic ester and the cyclic ether may be mixed together before being brought into reaction conditions. In an example, a mixture of the cyclic ester and the cyclic ether may be controllably, e.g. dropwise, added to a reaction mixture such that the ether units and ester units of the segment are polymerized in random order.

Preferred catalyst types are catalysts, such as dual catalyst systems like $AlCl_3$/DBU, which catalyse the ring opening polymerization of both, the cyclic ester and the cyclic ether.

In an exemplary embodiment, in step a) the polymerization starter compound is added to a reaction mixture containing the cyclic ester and the cyclic ether, which reaction mixture is maintained in reaction conditions. In this embodiment, step a) comprises forming a reaction mixture containing the cyclic ester and the cyclic ether, bringing the reaction mixture in reaction conditions, such as suitable temperature and suitable atmosphere for the addition reaction and adding the polymerization starter compound to the reaction mixture. A suitable atmosphere for reaction conditions may be an oxygen free atmosphere.

In an example, the polymerization starter compound is dropwise added in a liquid form to the reaction mixture. The polymerization starter compound may be dissolved in a solvent and the dissolved polymerization starter compound may be dropwise added to the reaction mixture.

In an exemplary embodiment, in step a) the cyclic ether comprises a hydroxyl group. In an example, the cyclic ether is a trimethylolpropaneoxetane monomer, which has one hydroxyl group. The functional group of the cyclic ether may additionally react with another cyclic ether or cyclic ester to form an ether unit, which has at least three links to other units of the segment. In this way a branched segment is formed.

In an exemplary embodiment, in step a) the polymerization starter compound is a multifunctional starter for starting at least two ring-opening polymerization reactions per molecule, wherein the at least one functional group of the polymerization starter compound comprises at least one of the group consisting of two hydroxyl groups, two secondary amine groups and a primary amine group. In this embodiment, the at least one functional group of the polymerization starter compound is multifunctional by starting the forming of at least two chains from the same polymerization starter compound. As such, the multifunctional polymerization starter compound enables that at least two segments are formed during step a) from the same polymerization starter compound.

In an exemplary embodiment, in step a) the cyclic ether provides an ether unit selected from the group consisting of the formula (III) $—[CR^{30}_2]_n—O—$, wherein n is an integer of 2 or 3, and $R^{30}$ independent of each other represent organic groups having 1 to 25 carbon atoms or hydrogen.

In an exemplary embodiment, wherein, in case n is equal to 2, at least one of the $R^{30}$ represents an ether group having the formula $—R^{31}—O—R^{32}$, wherein $R^{31}$ and $R^{32}$ independent of each other represent organic groups having 1 to 30 carbon atoms.

In another aspect of the present invention an acid functional compound is provided comprising:

i. at least one segment consisting of at least one ether unit and at least one ester unit, which are connected to one another by an ether link or an ester link, wherein each segment is defined by the largest portion between two ester links and wherein the sum of the number of ether units and ester units is at least three, wherein the ether units and the ester units of said at least one segment are arranged in random order; and at least one acidic group ii. which is selected from the group consisting of a phosphoric acid group, a phosphoric acid ester group, a sulfonic acid group, a sulfonic acid ester group and a carboxylic acid group, wherein the at least one acidic group is covalently linked to the at least one segment.

In another aspect of the present invention an acid functional compound is provided obtainable from a method for producing an acid functional compound according to the present invention, wherein the ether units and the ester units of a segment of said at least one segment are arranged in random order.

In an embodiment of the present invention the acid functional compound is according to the general formula (I)

$$Y(—X—W—(Z)_c)_q \quad (I)$$

with q=1-200 and c is independently selected and represented by an integer of 1-6, Y is independently selected and is represented by an organic group containing 1-500 carbon atoms, X is independently selected and is represented by O, NH and/or $NR^1$, with $R^1$ independently selected and represented by a chemical bond to a carbon atom of Y and/or an independently selected organic group containing 1-500 carbon atoms, W is independently selected and is represented by a linear or branched chain consisting of structural units S and structural units E, the structural units S are independently selected and are represented by the structural units (S1) and/or (S2)

(S1)

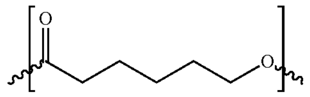

-continued (S2)

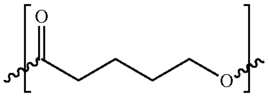

the structural units E are independently selected and are represented by the structural units (E1) and/or (E2)

(E1)

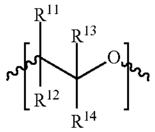

(E2)

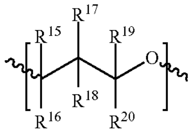

with $R^{11}$, $R^{12}$, $R^{13}$ and $R^{14}$ in each case independently of one another represented by hydrogen and/or a connective group ~$R^{101}$—$CH_2$—O~ and/or a non-connective organic group containing 1-25 carbons atoms, with the proviso that at least two residues of the group consisting of $R^{11}$, $R^{12}$, $R^{13}$ and $R^{14}$ are represented by hydrogen and $R^{101}$ is independently selected and is an optional group represented by an organic group containing 1-25 carbon atoms, $R^{15}$, $R^{16}$, $R^{17}$, $R^{18}$, $R^{19}$ and $R^{20}$ in each case independently of one another represented by hydrogen and/or a connective group ~$R^{102}$—$CH_2$—O~ and/or a non-connective organic group containing 1-25 carbons atoms, with the proviso that at least four residues of the group consisting of $R^{15}$, $R^{16}$, $R^{17}$, $R^{18}$, $R^{19}$ and $R^{20}$ are represented by hydrogen and $R^{102}$ is independently selected and is an optional group represented by an organic group containing 1-25 carbon atoms, W consists of 4-50 structural units of the group consisting of the structural units S and E, with the proviso that the molar proportion of S:E is 12:1-1:5, the possible structural unit links in the chain W are selected from the group consisting of S-S, E-E, S-E and E-S, where the chain W contains more than one link of the group consisting of the links S-E and E-S and the equation (1) is fulfilled number of S-E links in the W chain +number of the E-S links in the W chain/number of the structural units U in the W chain >1 (1) with U represented by either the structural unit S or the structural unit E which is not present in the surplus in the W chain, Z is an independently selected group and is represented by hydrogen and/or an independently selected moiety Z-a containing 0-600 carbon atoms and containing at least one acidic residue which is selected from the group consisting of a phosphoric acid group, an acidic phosphoric acid ester group, a sulfonic acid group, an acidic sulfonic acid ester group and a carboxylic acid group, with the proviso that in the general formula (I) at least one Z is represented by Z-a.

In case $R^1$ is represented by a chemical bond to a carbon atom of Y the relevant molecule has a corresponding cyclic structure.

The structural units S contain exactly two connective groups each providing a possible link to another S or E. A structural unit E contains also exactly two connective groups if it contains no connective group identified by ~$R^{101}$—$CH_2$—O~ and/or ~$R^{102}$—$CH_2$—O~. In such a case E contains as substituents only non-connective groups providing not a possible structural unit link to another S or E. Such a E unit contains exactly two structural unit links. The existence of more than two connective groups (concerning one E unit) provide the possibility of branched W chains. For example the connective group ~$R^{101}$—$CH_2$—O~ might be linked with a S unit in order to form a structure element according to ~$R^{101}$—$CH_2$—O~. Consequently, a E unit having more than two connective groups might have more than two structural unit links to another S or E units.

The expression "optional group" should mean that the relevant group may be or may not be present. For example: in case $R^{102}$ is not present corresponds to ~$R^{102}$—$CH_2$—O~ corresponds to ~$CH_2$—O~.

The sequence of S and E in the W chain is a basic aspect of these embodiments of the present invention. It is generally possible to provide corresponding block structures of S and E on the one hand but on the other hand it is possible to generate structures in which the structural units S and E are (more or less) randomly copolymerized into the W chain (random copolymer type). According to the embodiments of the present invention the W chain should provide (more or less) random sequences of S and E, where equation (1) is provided as a kind of quantitative measure how randomly S and E has to be copolymerized into the W chain. The basis of the definition according to equation (1) is that there are relatively more S-E and E-S links in a random structure than in a corresponding block structure.

The further parameter of equation (1) is U which is represented by either (the number of) the structural unit S or (the number of) the structural unit E which is not present in the surplus in the W chain. This means that U generally represents the number of the structural unit type (S or E) which has the smaller number of its species in the W chain. However, in case there is the same number of S and E in the W chain: U=number of S in the W chain=number of E is the W chain.

Embodiments of the present invention also concern a method of producing an acid functional compound as described above, where in a first step Y(—X—H)$_q$ is used as a polymerization starter and a cyclic ester co-monomer Sm generating the structural unit S is randomly copolymerized with a cyclic ether co-monomer Em generating the structural unit E, where the intermediate product of the first step is according to the formula Y(—X—W—(H)c)$_q$ which is converted in a second step with an agent providing the moiety Z-a in order to generate the compound according to the general formula (I).

The random copolymerization of Sm and Em is the basis for the generation of species fulfilling equation (1). However, as a result of a random copolymerization there is generally a wide spectra of species having different sequences of S and E (received is a product mixture). From a statistical point of view it is very likely that some of said received species do not fulfill equation (1) because having a block-like structure (can be deemed as to be side products). However, normally most of the received species will fulfill the condition of equation (1).

As described above according to the embodiments of the present invention the W chain should provide (more or less) random sequences of S and E, where equation (1) is provided as a kind of quantitative measure how randomly S and E has to be copolymerized into the W chain. From a statistical point of view a corresponding random copolymerization generally leads to copolymer species fulfilling equation (1).

For the characterization of the both types of polymers—block types and random types—different analytical methods could be used for example elementary analysis, $^1$H NMR, $^{13}$C NMR, UV and IR spectroscopy, GPC and DSC. If the glass transition temperatures of the corresponding homopolymers (each based on one relevant monomer type) are sufficiently different, it is possible to distinguish between corresponding homo- and random polymers by means of DSC (differential scanning calorimetry) measurement. An exact description of the analytical methods to distinguish between block and random polymers are described in the literature (*Polymere, Synthese, Eigenschaften und Anwendung*, S. Koltzenburg, M. Maskos, O. Nuyken, Springer-Verlag Berlin Heidelberg, 2014, S. 397-399).

In a particular example, the characterization of the both types of polymers—block types and random types—may be performed by a method comprising the steps of: first hydrolyzing ester links of the at least one segment thereby obtaining sequences of the at least one segment which are free of ester groups. These sequences may have various sequence lengths composed of a number of ether links L between adjacent ether units and optionally including an ether link of an ester unit to an ether unit. The average number length of the sequences of ether units may be determined based on e.g. LC-MS techniques and/or GPC techniques. From these measurements, the average number of ether links L between adjacent ether units may be determined and an average number of ether units E may be determined.

Optionally, the average number of ether links L between adjacent ether units and/or the average number of ether units E may be determined using other techniques like for example with NMR.

Typically the acid functional compound of the embodiments of the present invention contains different acid functional compound species, where at least 70 mol.-% of these species fulfill the following equation:

Number of S-E links in the W chain+number of the E-S links in the W chain/number of the structural units U in the W chain>1.2

In an preferred embodiment of the invention in the general formula (I) c=1 so that the general formula (I) is according to the general formula (Ia)

$$Y(\text{-X-W-Z})_q \qquad \text{(Ia)}$$

with q=1-200 so that W is independently selected and is represented by a linear chain and the structural units E are independently selected and are represented by the structural units (E1) and/or (E2)

with $R^{11}$, $R^{12}$, $R^{13}$ and $R^{14}$ in each case independently of one another represented by hydrogen and/or a non-connective organic group containing 1-25 carbons atoms, with the proviso that at least two residues of the group consisting of $R^{11}$, $R^{12}$, $R^{13}$ and $R^{14}$ are represented by hydrogen, $R^{15}$, $R^{16}$, $R^{17}$, $R^{18}$, $R^{19}$ and $R^{20}$ in each case independently of one another represented by hydrogen and/or a non-connective organic group containing 1-25 carbons atoms, with the proviso that at least four residues of the group consisting of $R^{15}$, $R^{16}$, $R^{17}$, $R^{18}$, $R^{19}$ and $R^{20}$ are represented by hydrogen and in the general formula (Ia) at least one Z is represented by Z-a.

In some embodiments the structural units E contain exactly two connective groups so that linear W chains are formed. These type of acid functional compounds provide especially advantages in connection with dispersing applications based on inorganic pigments/fillers having a low specific surface area.

Typically each of the general formula (I) and the general formula (Ia) contain 1-200, preferably 1-50 and more preferably 1-25 Z which are independently selected and which are represented by Z-a.

Z-a is a group providing affinity to particles, such as inorganic particles.

In a preferred embodiment of the invention in the general formula (I) and in the general formula (Ia) q is not smaller than the number of Z-a moieties.

Preferably 80-100 mol.-%, and more preferably 100 mol.-% of the structural units S are represented by the structural unit (S1). The structural unit (S1) is generated by polymerization of ε-caprolactone and the structural unit (S2) by the polymerization of δ-valerolactone. ε-caprolactone is a generally commercially available and economically attractive. Furthermore, ε-caprolactone has a lower tendency to crystalize compared to δ-valerolactone and normally provides a better compatibility.

Frequently in structural unit (E1) at least one of the residues of the group consisting of $R^{11}$, $R^{12}$, and $R^{13}$ and $R^{14}$ are represented by an organic group containing 1-22 carbon atoms. Not unusually in structural unit (E1) at least one of the residues of the group consisting of $R^{11}$, $R^{12}$, $R^{13}$ and $R^{14}$ are represented by an independently selected $C_1$-$C_4$ alkyl group and/or an independently selected organic group which is according to the formula $$\sim CH_2—O—R^{201}$$

with $R^{201}$ independently selected and represented by a $C_1$-$C_{20}$ alkyl group, a $C_1$-$C_{20}$ alkylaryl group, a $C_1$-$C_{20}$ arylalkyl group, a $C_1$-$C_{18}$ aryl group, a $C_1$-$C_{20}$ heteroalkyl group, a $C_1$-$C_{20}$ heteroalkylaryl group, a $C_1$-$C_{20}$ heteroarylalkyl group and/or a $C_1$-$C_{18}$ heteroaryl group.

The structural unit (E1) is generated by the polymerization of a corresponding epoxy functional monomer. Suitable types or species are for example: aliphatic, cycloaliphatic, aromatic and/or araliphatic glycidyl ether, glycidyl ester and olefin oxides like $C_1$-$C_{20}$ alkyl glycidyl ether, phenyl glycidyl ether, cresyl glycidyl ether, naphthyl glycidyl ether, butyl glycidyl ether, p-tert.-butyl-phenyl glycidyl ether, 2-ethyl-hexyl glycidyl ether, $C_{12}$-$C_{14}$-glycidyl ether, allyl glycidyl ether, 2,3-epoxypropylneodecanoate (Cardura® E 10, Resolution Performance Products), $C_4$-$C_{20}$-olefine oxides like 1,2-octene oxide, 1,2-nonene oxide, 1,2-undecene oxide, 1,2-dodecene oxide, 1,2-octadecene oxide, 4-methyl-1,2-pentene oxide, 1,2 butene oxide, propene oxide, ethylene oxide, styrene oxide, butadiene monoxide, isoprene monoxide, cyclopentene oxide and/or 2-ethyl-1,2-butene oxide. In the case the structural unit E1 contains a connective group $\sim R^{101}—CH_2—O\sim$, this structural unit is derived from a corresponding epoxy functional monomer bearing at least one hydroxyl functional group, like for example glycidol.

Normally in structural unit (E2) at least one of the residues of the group consisting of $R^{15}$, $R^{16}$, $R^{17}$ $R^{18}$, $R^{19}$ and $R^{20}$ are represented by an independently selected $C_1$-$C_{24}$ hydrocarbon group and/or an independently selected organic group which is according to the formula $$\sim CH_2—O—R^{202}$$

with $R^{202}$ independently selected and represented by an organic group containing 1-24 carbon atoms.

The structural unit (E2) is generated by the polymerization of a corresponding oxetane-monomer. Suitable types or species are for example: non-substituted oxetane and its aliphatic, cycloaliphatic, aromatic and/or araliphatic derivatives like 3-ethyl-3-(phenoxymethyl) oxetane and, 3-ethyl-3-(2-ethylhexyloxymethyl)oxetane, 3,3-dipropyl oxetane, 3,3-diethyl oxetane, 3-ethyl-3-butyl oxetane, 3-butyl-3-methyl oxetane, 3-ethyl-3-methyl oxetane and ethylhexyl oxetane.

In the case the structural unit (E2) contains a connective group $\sim R^{102}—CH_2—O\sim$, this structural unit is derived from a corresponding oxetane functional monomer bearing at least one hydroxyl functional group, like for example 3-ethyl-3-(hydroxymethyl)oxetane, 3-methyl-3-(hydroxymethyl) oxetane and its derivatives obtained by ethoxylation or propoxylation with 1-10 ethylene oxide and/or propylene oxide, which can be arranged in a statistical-, block- or gradient-structure.

In a preferred embodiment of the invention 70-100 mol.-%, preferably 100 mol.-% of the structural units E are represented by the structural unit (E1). The corresponding monomers (epoxides) are reactive educts and generally commercially available. Most epoxides are attractive from an economic point of view. Preferably, the W chain consists of 4-30, more preferably of 5-20 structural units selected from the group consisting of the structural units S and E.

This provides a beneficial handling, a lower viscosity and better solubility of the relevant products.

In a preferred embodiment the molar proportion of the structural units S:E in the W chain is 9:1-1:1 so that U is represented by E. In order to optimize the compatibility in the dispersing system it is generally advantageous that the W chain contains at least as many S monomer units as E monomer units. Such acid functional compounds can be used successfully in both polar and apolar binder systems, and have an excellent compatibility when used as wetting agents and dispersants and/or as dispersion stabilizers. This ensures the successful use in combination with a wide variety of binders and coating materials.

It is generally preferred that Y and the corresponding polymerization starter $Y(—X—H)_q$ contains only (exclusively) chemical elements of the group consisting of carbon, hydrogen, nitrogen and oxygen. It is also possible to use mixtures of different polymerization starter $Y(—X—H)_q$ species.

The parameter q has a defining impact on the structure of the acid functional compounds according to the invention. The fact that q may be independently selected means that it is also possible to use mixtures of different species which differ by the q value.

Species with higher "q values", for example, usually provide controlled flocculation behavior resulting in improved anti-settling and anti-sagging properties in particular whereas species with low "q values" in particular those with q=1 usually have an increased tendency toward deflocculation behavior. It can be concluded in general that the larger the q value, the more adhesive groups there are per molecule and the greater is usually the adhesion of the molecule to solid surfaces.

To optimize the deflocculation effect, species with q=1 should preferably be used (optionally exclusively).

In one specific embodiment in the general formula (I) X is represented by O, q=1 and Y contains 1-80, preferably 1-30 carbon atoms.

In most cases when $Y(—X—H)_q$ is a polymerization starter with X being represented by O, Y contains at least one polyether radical, polyester radical and/or hydrocarbon radical. Frequently Y contains not only one but a plurality of the aforementioned types of radicals.

The alcohol $Y(—O—H)_q$ used in synthesis of the acid functional compounds according to the invention may contain additional heteroatoms, such as O and/or N and/or ether, urethane, carbonate, amide, urea and/or ester groups. The Y radical may contain additional groups, such as C═C double bonds and/or tertiary amine groups, which are inert in the formation of the acid functional compounds. The ester, ether, urethane, and/or carbonate groups that are optionally present may be present in block structure (for example, polyethylene oxide block-polypropylene oxide block-poly-ε-caprolactone block), may form a gradient or may also be arranged randomly.

With regard to ether groups and/or polyethers which may be present in Y: Examples of $Y(—O—H)_q$ that may be used may also include mono-, di- or polyhydroxy polyethers which may be synthesized, for example, by alkoxylation of the compounds described above as $Y(—O—H)_q$, such as alkanols, cycloalkanols, phenols with alkylene oxides, such as ethylene oxide, propylene oxide, butylene oxide, styrene oxide, aliphatic or aromatic glycidyl ethers, such as isopropyl glycidyl ether, butyl glycidyl ether, allyl glycidyl ether, 2-ethylhexylglycidyl ether, cresol glycidyl ether and phenyl glycidyl ether. Mixtures of these raw materials may also be used. In the case of mixed polyethers, they may be arranged randomly, in gradient form or in blocks.

These polyethers often have a number-average molecular weight (Mn) in the range of approx. 100 to 10.000, especially frequently from 150 to 7.500 and especially typically from 200 to 5.000 g/mol.

Polyethers based on ethylene oxide, propylene oxide and mixtures thereof are preferred. Examples include hydroxyl functional vinyl compounds, such as hydroxybutyl vinyl ether, monohydroxy-functional polyoxyalkylene monoalcohols, such as allyl polyether (e.g., polyglycol A 350, polyglycol A 500, polyglycol A 1100, polyglycol A 11-4, polyglycol A 20-10 or polyglycol A 20-20 of Clariant AG or Pluriol® A 010 R, Pluriol® A 11 RE, Pluriol® A 13 R, Pluriol® A 22 R or Pluriol® A 23 R of BASF AG), vinyl polyethers (such as polyglycol V 500, polyglycol V 1100 or polyglycol V 5500 of Clariant AG), methanol-initiated polyoxyethylene monoalcohols (such as Pluriol® A 350 E, Pluriol® A 500 E, Pluriol® A 750 E, Pluriol® A 1020 E, Pluriol® A 2000 E or Pluriol® A 5010 E of BASF AG), alkanol-initiated polyoxypropylene monoalcohols (such as polyglycol B01/20, polyglycol B01/40, polyglycol B01/80, polyglycol B01/120 or polyglycol B01/240 of Clariant AG or Pluriol® A 1350 P or Pluriol® A 2000 P of BASF AG) and polyalkoxylates with a variable degree of alkoxylation, initiated with various fatty alcohols (available under the brand names Lutensol® A, Lutensol® AT, Lutensol® AO, Lutensol® TO, Lutensol® XP, Lutensol® XL, Lutensol® AP and Lutensol® ON of BASF SE). Polyoxyalkylene monoalcohols containing ethylene oxide and/or propylene oxide and/or butylene oxide groups and optionally modified with styrene oxide are preferred. It is particularly preferred to use polyoxyalkylene monoalcohols (such as polyglycol B 11/50, polyglycol B 11/70, polyglycol B 11/100, polyglycol B 11/150, polyglycol B 11/300 or polyglycol B 11/700 of Clariant AG, Pluriol® A 1000 PE, Pluriol® A 1320 PE, or Pluriol® A 2000 PE of BASF AG or Terralox WA 110 of DOW Chemicals) which are butanol-initiated polyoxyalkylenes of ethylene and propylene oxide with a terminal OH group.

Y usually contains 1 to 200 ether oxygen atoms which are preferably present in groups containing ether oxygen atoms derived from polytetrahydrofuran, polyoxetanes and/or polyoxiranes.

Y preferably contains 3 to 100 ether oxygen atoms, at least 50 preferably at least 80 mol.-% of the ether oxygen atoms being present in ethylene oxide and/or propylene oxide structure units.

Regarding the hydrocarbon radicals that may be present in Y:

The hydrocarbon radicals are preferably present in the form of an allyl radical, branched or unbranched alkylaryl radical, aralkyl radical and/or as acyclic, cyclic, branched or unbranched alkyl radical. Mixtures of such compounds, i.e., at least two different compounds $Y(—O—H)_q$ may also be used. The aliphatic or araliphatic compounds $Y(—O—H)_q$ may be linear or branched, saturated or unsaturated. Saturated species are preferred.

Examples of $Y(—O—H)_q$ with hydrocarbon radicals in which q=1 include methanol, ethanol, butanol, ethyl hexanol, decanol, isotridecyl alcohol, lauryl alcohol, stearyl alcohol, isobornyl alcohol, benzyl alcohol, propargyl alcohol, oleyl alcohol, linoleyl alcohol, oxo alcohols, neopentyl alcohol, cyclohexanol, fatty alcohols, alkyl phenols, alkyl naphthols and phenyl ethanol.

Examples of $Y(—O—H)_q$ with hydrocarbon radicals in which q>1 include butanediol, hexanediol, cyclohexane dimethanol, neopentyl glycol, ethylene glycol, glycerol, trimethylolpropane and sugars (such as pentaerythritol).

In addition, $Y(—O—H)_q$ polyolefin polyols or monools, such as non-hydrogenated, partially hydrogenated and/or completely hydrogenated polybutadienes, non-hydrogenated, partially hydrogenated and/or completely hydrogenated polyisoprenes, polyisobutylenes, polypropylene or ethylene/butylene copolymers may be used. These compounds are known to those skilled in the art.

Regarding the ester groups and/or polyesters which may be present in Y:

Monohydroxy monoesters and mono-, di- or polyhydroxy polyesters may also be used as $Y(—O—H)_q$.

Hydroxy functional acrylates or methacrylates, such as hydroxyethyl acrylate, hydroxyethyl methacrylate, hydroxybutyl (meth)acrylate are examples of suitable monohydroxy monoesters.

Polyesters, for example, can be synthesized by reacting dicarboxylic acids as well as their esterifiable derivatives, such as anhydrides, acid chlorides or dialkyl esters (such as dimethyl esters or diethyl esters) by reaction with diols and mono-, di- or trifunctional initiator components. The formation of dihydroxy polyesters can be suppressed as needed by using stoichiometric amounts of monohydroxy compounds. The esterification may be performed in substance or by azeotropic esterification in the presence of an entraining agent. Examples of dicarboxylic acids include succinic acid, maleic acid, fumaric acid, glutaric acid, adipic acid, sebacic acid, pimelic acid, phthalic acid or dimerized fatty acids and their isomers as well as hydrogenation products. Examples of corresponding diols include ethylene glycol, 1,2-propanediol, 1,3-propanediol, 1,4-butanediol, 1,6-hexanediol, neopentyl glycol, cis-1,2-cyclohexane dimethanol, trans-1,2-cyclohexane dimethanol, as well as polyglycols based on ethylene glycol and/or propylene glycol.

Preferred polyesters for use as $Y(—O—H)_q$ include those that can be obtained by polycondensation of one or more optionally alkyl-substituted hydroxycarboxylic acids and/or ring-opening polymerization of the corresponding lactones, such as propiolactone, valerolactone, butyrolactone, caprolactone and/or substituted lactones by means of a mono-, di- or trihydroxy initiator component. These preferably have a number-average molecular weight Mn of 150 to 5000 g/mol. In principle, all the other compounds listed as $Y(—O—H)_q$ may also be used as initiator components. Mixtures of the aforementioned compounds may also be used. The lactone polymerization is performed by methods, which are known to those skilled in the art.

Regarding urethane radicals and/or polyurethanes that may be contained in Y: Polyurethanes, polyether polyurethanes, polyester polyurethanes and/or polyether polyester polyurethanes that can be obtained by addition reaction of diisocyanates with dihydroxy compounds in the presence of mono-, di- or trifunctional initiator components may also be used as $Y(—O—H)_q$. Diols with 2 to 12 carbon atoms, polyoxyalkylene glycols and dihydroxy-functional polyesters may also be used as hydroxyl compounds for synthesis of the $Y(—O—H)_q$ compounds containing urethane groups. The polyethers on the polyesters are described above.

Regarding the polycarbonates that may be contained in Y:

The Y radical may also contain carbonate groups, such as those obtained by known reactions with open chain or cyclic carbonates. For example, linear polyesters or polycarbonate diols modified with carbonates, such as those used in the synthesis of polyurethane are suitable. Suitable carbonates include, for example, aliphatic, cycloaliphatic, araliphatic and/or aromatic carbonic acid esters, such as dialkyl carbonates, i.e., dimethyl carbonate, diethyl carbonate or diphenyl carbonate, catechol carbonate or cyclic alkylene carbonates. Cyclic alkylene carbonates with 5- or 6-membered rings which may optionally be substituted are especially suitable. Preferred substituents include aliphatic, cycloaliphatic and/or aromatic groups with up to 30 carbon atoms. Examples of suitable cyclic alkylene carbonates include ethylene carbonate, ethylene carbonate, propylene carbonate, glycerol carbonate, trimethylene carbonate, 4-methyltrimethylene carbonate, 5-methyltrimethylene carbonate, 5,5-dimethyltrimethylene carbonate, 5,5-diethyltrimethylene carbonate or 5-methyl-5-propyltrimethylene carbonate.

Regarding polyoxazolines which may be contained in Y:

Hydroxy functional poly-2-alkyl-2-oxazolines or poly-2-alkyl-2-oxazines may also function as $Y(—O—H)_q$. Monohydroxy-functional compounds are preferably used. Poly-2-alkyl-2-oxazolines or poly-2-alkyl-2-oxazines are obtained by cationic, ring-opening polymerization of 2-alkyl-2-oxazolines or 2-alkyl-2-oxazines with initiators, such as para-toluenesulfonic acid, methyl tosylate or methyl triflate. The oxazolinium or oxazinium end groups resulting from the living cationic polymerization mechanism can be converted to the more stable hydroxyamides by alkaline hydrolysis via amino ester end groups. An alternative method of synthesis of monohydroxy-functional poly-2-alkyl-2-oxazolines or poly-2-alkyl-2-oxazines is by polymerization with 2-(4-hydroxyphenyl)-N-methyl-2-oxazolinium trifluoromethane sulfonate as the initiating species. The compatibility can be controlled through the choice of the alkyl substituents so that, for example, poly-2-ethyl-2-oxazoline is suitable for highly polar systems because of its water solubility, whereas poly-2-lauryl-2-oxazoline, for example, is compatible in apolar systems. If block copolymers of 2-ethyl-2-oxazoline and 2-lauryl-2-oxazoline are formed, then the polymers are characterized by a particularly broad compatibility. Such poly-2-alkyl-2-oxazoline or poly-2-alkyl-2-oxazines usually have a number-average molecular weight Mn of 300 to 10,000 g/mol, preferably from 500 to 5,000 g/mol. Various 2-oxazolines which might also have additional functional groups may also be used. Such species include, for example, the corresponding 2-oxazolines based on fatty acids.

Regarding OH-functional polymers of ethylenically unsaturated compounds that may be present in Y:

OH-functional polymers of ethylenically unsaturated monomers may also be used as $Y(—O—H)_q$.

The OH functions may be introduced in the known way by way of the ethylenically unsaturated monomers, initiators or chain regulators. Monohydroxy-functional polyacrylic acid esters and/or polymethacrylic acid esters are preferred. For example, monohydroxy-functional polyacrylate macromers such as Actflow UMM 1001 from Soken Chemical & Engineering Co. are commercially available. These polyacrylates usually have a number-average molecular weight Mn of 300 to 12,000 g/mol, preferably usually from 500 to 9,000 g/mol. These may be formed in a block structure or may be randomly arranged or may forma gradient.

Examples of OH-functionally ethylenically unsaturated monomers include hydroxyalkyl (meth)acrylates of linear, branched or cycloaliphatic diols with 2 to 36 atoms, such as 3-hydroxypropyl methacrylate, 3,4-dihydroxybutyl monomethacrylate, 2-hydroxyethyl (meth)acrylate, 4-hydroxybutyl (meth)acrylate, 2-hydroxypropyl methacrylate, 2,5-dimethyl-1,6-hexanediol monomethacrylate; caprolactone and/or valerolactone-modified hydroxyalkyl (meth) acrylates (wherein the hydroxy (meth)acrylates are preferably derived from linear, branched or cycloaliphatic diols with 2 to 8 carbon atoms); OH-functional poly(ethylene glycol) (meth)acrylate and OH-functional poly(propylene glycol) (meth)acrylate.

Examples of additional ethylenically unsaturated monomers includes alkyl (meth)acrylates of linear, branched or cycloaliphatic alcohols with 1 to 22 carbon atoms, such as methyl (meth)acrylate, ethyl (meth)acrylate, n-butyl(meth) acrylate, isobutyl (meth)acrylate, tert-butyl (meth)acrylate, lauryl (meth)acrylate, 2-ethylhexyl (meth)acrylate, stearyl (meth)acrylate, cyclohexyl (meth)acrylate, isobornyl (meth) acrylate and tert-butyl (meth)acrylate; aryl (meth)acrylates, such as benzyl methacrylate or phenyl acrylate (wherein the aryl radicals may each be unsubstituted or substituted up to four times), such as 4-nitrophenyl methacrylate; mono (meth)acrylates of ethers, polyethylene glycols, polypropylene glycols or mixed polyethylene/propylene glycols with 5 to 80 carbon atoms, such as tetrahydrofurfuryl methacrylate, methoxyethoxyethyl methacrylate, 1-butoxypropyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate, poly(propylene glycol)methyl ether (meth)acrylate; aminoalkyl (meth)acrylate, such as N,N-dimethylaminoethyl (meth)acrylate, 2-trimethyl-ammoniumethyl methacrylate chloride and N,N-dimethylaminopropyl (meth)acrylate; styrene and substituted styrenes, such as 4-methylstyrene, methacrylonitrile and acrylonitrile; ethylenically unsaturated heterocycles, such as, for example, 4-vinylpyridine and 1-[2-(methacryloyloxy)ethyl]-2-imidazolidinone; vinyl esters of carboxylic acids with 1 to 20 carbon atoms, such as vinyl acetate; maleinimide, N-phenylmaleinimide and N-substituted maleinimides with linear, branched or cycloaliphatic alkyl groups with 1 to 22 carbon atoms, such as N-ethylmaleinimide and N-octylmaleinimide; (meth)acrylamide; N-alkyl- and N,N-dialkyl-substituted acrylamides with linear, branched or cycloaliphatic alkyl groups with 1 to 22 carbon atoms, such as N-(tert-butyl) acrylamide and N,N-dimethylacrylamide.

Preferred monomers that are not OH-functional include alkyl (meth)acrylates, aryl (meth)acrylates and styrene.

Regarding tertiary amines which may be contained in Y:

Hydroxy functional compounds having tertiary amines may also function as $Y(—O—H)_q$.

Examples of appropriate hydroxyl functional compounds having tertiary amines are 2-dimethylamino ethanol, 2-diethylamino ethanol, 3-dimethylamino propanol, 3-diethylamino propanol, 2-[2-(Dimethylamino)ethoxy] ethanol, N,N,N'-trimethylaminoethyl ethanolamine, N,N-dimethyl isopropanolamine, N-ethyl-N-(2-hydroxyethyl) aniline, N,N,N'-trimethyl-N'-hydroxyethyl-bisamino ethylether and N,N-bis-(3-dimethylaminopropyl)-N-isopropanolamine, Tris(2-hydroxyethyl)amine.

In a further preferred embodiment of the present invention the corresponding polymerization starter $Y(—X—H)_q$ is an amino hydroxy compound with X being represented by O and NH and/or $NR^1$ and the proviso, that q is ≥2.

Examples of appropriate amino hydroxy compounds are ethanolamine, propanolamine, iso-propanolamine, 4-aminobutanol, 5-aminopentanol, 6-aminohexanol, 2-(2-aminoethoxy) ethanol, N-methyl ethanolamine, N-ethyl ethanolamine, N-butyl ethanolamine, diethanolamine, 3-((2-hydroxyethyl)-amino)-1-propanol, diisopropanolamine, 2-(2-Aminoethylamino)ethanol and N-(2-hydroxyethyl) aniline.

In one specific embodiment of the present invention the corresponding polymerization starter $Y(—X—H)_q$ is an aminic compound with X being represented by NH and/or $NR^1$. The aminic compound $Y(—X—H)_q$ used in synthesis of the acid functional compounds according to the invention may contain additional heteroatoms, such as O and/or N and/or ether, amide and/or urea groups. The Y radical may contain additional groups, such as C═C double bonds and/or tertiary amine groups which are inert in the formation of the acid functional compounds. The ether groups that are optionally present may be present in block structure (for example, polyethylene oxide block-polypropylene oxide block), may form a gradient or may also be arranged randomly.

In one specific embodiment of the invention in the general formula (I) X is represented by NH and/or $NR^1$, q=1-200, preferably q=2-50 and Y contains 1-250 amino groups.

Normally $R^1$ is independently selected and is represented by a chemical bond to a carbon atom of Y and/or an independently selected organic group containing 1-20 carbon atoms.

Examples of appropriate monofunctional amines which can be used as a polymerization starter $Y(—X—H)_q$ are for example, aliphatic, cycloaliphatic, aromatic and/or araliphatic amines. Examples therefor are butylamine, hexylamine, 2-ethyl-1-hexylamine, bis(2-ethylhexyl)amine, dibutylamine, diethylamine, dipropylamine, benzylamine, N-benzylmethylamine and N-phenylbenzylamine and cyclohexylamine.

Further examples are saturated and unsaturated primary fatty amines like (hydrogenated) tallow amine, cocos amine, stearyl amine and $C_{16}$-$C_{22}$ alkylamine (available under the brand name Rofamin® types from Ecogreen Oleochemicals GmbH). Saturated and unsaturated primary as well as secondary aliphatic (fatty) amines (available under the brand name Armeen® types from Akzo Nobel Surface Chemistry LLC) may also be used as polymerization starters.

Further examples of appropriate monofunctional amines are polyether monoamines represented by the general formula:

$$R^{t}\text{-}[OEt]_d[OPr]_e[OBU]_f\text{-}NH_2$$

with $R^t$ an alkyl residue with 1 to 22 carbon atoms, preferably with 1 to 4 carbon atoms. The d [OEt], e [OPr] and f [OBu] units can be arranged in any order. This includes, in particular, a statistical sequence or the arrangement in the form of [OEt], [OPr] and/or [OBu] blocks or an arrangement in the form of a gradient, for example an enrichment or depletion of [OEt] or the others alkoxy units along the polyalkylene oxide chain. Examples of appropriate polyethermonoamines are JEFFAMINE® M types from Huntsman Corporation (for example JEFFAMINE® M-2070, JEFFAMINE® M-2005, JEFFAMINE® M-600 and JEFFAMINE® M-1000) and Surfonamine® L types and Surfonamine® B types from Huntsman Corporation (for example Surfonamine® L-100, Surfonamine® L-200, Surfonamine® L-207, Surfonamine® L-300, Surfonamine® B-60, Surfonamine® B-100, Surfonamine® B-200).
Preferably, d>e>f. Particular preference is given to f=0. Particular preference is given to f=0 and the ratio of d/e>1, better>2 and even better>3, for example 3 to 50.

Amino functional compounds having tertiary amines may also be used as $Y(—X—H)_q$. Examples of appropriate amino functional compounds having tertiary amines are 2-(diethylamino)ethylamine, 2 (dimethylamino)ethylamine, 3-(dimethylamino)propylamine, 3-(diethylamino)propylamine, bis-(3-dimethylaminopropyl)amine, N-(3-aminopropyl) imidazole, 1-(3-Aminopropyl)-2-methyl-1H-imidazole, 2-(1H-Imidazol-1-yl)ethanamine, 2-(Aminomethyl)pyridine, 4-(Aminomethyl)pyridine and 3-(2-Ethyl-1H-imidazol-1-yl)propan-1-amine, tetramethyliminobispropylamine.

In one specific embodiment of the present invention a polyamine compound can be used as the corresponding polymerization starter $Y(—X—H)_q$. Examples of appropriate polyamine compounds are aliphatic linear polyamines, like 1,6-hexamethylendiamine, diethylentriamine (DETA), triethylentetramine (TETA), tetraethylenpentamine (TEPA), pentaethylenhexamine, hexaethylenheptamine and higher molecular homologues, linear condensation products according to the formula $NH_2—(C_2H_4NH)_n—C_2H_4—NH_2$ with n>5, dipropylentriamine, (3-(2-aminoethyl)aminopropylamine, N,N-bis(3-aminopropyl)methylamine, N,N-dimethyldipropylentriamine, and N,N'-bis(3-aminopropyl)-ethylendiamine, Tris(3-aminopropyl) amine, Tris(2-aminoethyl)amine; Further examples are Isophorondiamine, 4,4'-Diamino-diphenylmethane, 1,3- and 1,4-Xylylendiamine, 4,4'-Diaminodicyclohexylmethane, 1,4-Bis(aminomethyl)cyclohexane, 1-piperazineethaneamine, N,N'-bis-(2-aminoethyl) piperazine, N-[(2-aminoethyl) 2-aminoethyl]piperazine, di and/or polyamines based on polyalkylenoxides, examples of appropriate low molecular weight polyethers with amine groups are for example JEFFAMINE® D, ED, EDR, T and SD types from Huntsman Corporation (for example D-230, D-400, D-2000, D-4000, HK-511, ED-600, ED-900, ED-2003, EDR-148, EDR-176, T-403, T-3000, T-5000, SD-231, SD-401, SD-2001, ST-404). Typically aliphatic and branched polyamines, especially poly($C_2$-$C_4$)-alkylenamine, with primary, secondary and tertiary amino groups are used. Further appropriate species are such which are called polyethyleneimines and which are aziridine homopolymers like Lupasol® (BASF SE) or compounds which are known as Epomin® types (Nippon Shokubai). These compounds are synthesized according to know processes (e.g. polymerization of ethylene imine). Polyamines having a branched structure and having tertiary amino groups, which are not reactive in connection with the start of the polymerization, allow high molecular structures which do not cause high viscosities.

Generally, a low molecular weight often causes weak adsorption at the particle surfaces, wherein a high molecular weight might cause problems in connection with the handling and the solubility. Typically the polyamine contains no hydroxyl groups and has a molecular weight of at least 200 and contains at least 4, preferably at least 8 primary or secondary amino groups. Preferred polyamines contain at least six tertiary amino groups.

In alternative embodiments, the polyamine is modified with an epoxide monomer, such that it contains hydroxyl groups. The modified polyamine can be readily used as polymerization starter compound. The modified polyamine contains less primary amino groups and/or secondary amino groups and contains more hydroxyl groups. The advantage of the modified polyamine is that the resulting amine functional compound contains less amide links to a segment (and more ester links or ether links to a segment), thereby obtaining an amine functional compound having a lower viscosity.

In alternative embodiments, a polyamine may be prepared from an addition reaction of a multi epoxide (such as di epoxides, tri epoxides, tetra epoxides, penta epoxides or hexa epoxides) with compounds having at least one primary amine and oligoamines having at least one primary amine as described above.

The agent providing the moiety Z-a (second step) might be a poly- or dicarboxylic acid (or its anhydride).
Examples of appropriate poly- or dicarboxylic acids (or the corresponding anhydrides) are for example, maleic acid (or its anhydride), phthalic acid (or its anhydride), trimellitic acid (or its anhydride), hexahydrophthalic acid (or its anhydride), tetrahydrophthalic acid (or its anhydride), succinic acid (or its anhydride), humic acid (or its anhydride), dodecylsuccinic acid (or its anhydride), Pyrromellitic acid (or its anhydride), methyl hexahydrophthalic acid (or its anhydride), and methyl tetrahydrophthalic acid (or its anhydride).

Further examples of polycarboxylic acids (or the corresponding anhydrides) are for example copolymers of maleic anhydride and/or maleic acid with compounds having a reactive carbon-carbon double bond, like for example styrene, alpha-olefins, vinyl ethers, allyl ethers and (meth) acrylates, like for example, copolymers of maleic anhydride and ethylene, copolymers of maleic anhydride and propylene, copolymers of maleic anhydride and isobutylene, copolymers of maleic anhydride and isoprene, copolymers of maleic anhydride and methyl vinyl ether, copolymers of maleic anhydride and 1-octadecene, copolymers of maleic anhydride, ethylene, butylene and styrene, copolymers of maleic anhydride and polyalkylene glycol monoallyl ethers, copolymers of maleic anhydride and styrene.

The monomers of the appropriate polymer chain may be present in block structure, may form a gradient or may also be arranged randomly.

Furthermore, sulfuric acid, sulfur trioxide, chlorine sulfuric acid and sulfuryl chloride and sulfur dioxide might be used as said agent.

However, most beneficial are agents providing moieties Z-a having corresponding phosphor containing groups:

Preferably the moiety Z-a is independently selected, contains 0-500, preferably 0-20 carbon atoms and contains at least one acidic residue which is selected from the group consisting of phosphoric acid groups and phosphoric acid ester groups.

Typically Z-a is independently selected and is represented by the general formula (II)

$$\sim PO(V)_n(OH)_{2-n} \quad (II)$$

with

V independently selected and represented by a chemical bond to an oxygen atom of the same molecule and/or a group $OR^{33}$ with $R^{33}$ independently selected and represented by an organic group containing 1 to 500, preferably 1 to 35 carbon atoms and n independently selected and represented by 0 and/or 1.

In case V is a chemical bond to an oxygen of the same molecule normally a polyethylenimine or polyhydroxyl compound has been used a starter. $OR^{33}$ is often represented by the residue of the intermediate product (of the first reaction step) $Y(X—W—(H)_c)_q$, preferably with c=1 and q=1, which formed by reaction with an ester-forming phosphorus compound the acidic phosphoric acid ester derivative according to the invention.

Generally $OR^{33}$ can also be represented by the residue of $Y(—O—H)_q$ species as described above, preferably with q=1. This may be the case, when small amounts of corresponding hydroxyl group containing compounds are reacted together with $Y(X—W—(H)_c)_q$ species with an ester-forming phosphorus compound under formation of phosphoric acid esters.

Normally n=0. The use of polyphosphoric acid normally provides products with n=0 (explained below).

Preferably, acidic phosphoric acid ester derivatives according to the invention are synthesized by reacting at least one hydroxyl group of the intermediate product (of the first reaction step) with an ester-forming phosphorus compound under formation of acidic phosphoric acid esters.

An ester-forming phosphorus compound is understood to be a compound capable of forming phosphoric acid ester by reaction with a compound that contains hydroxyl groups. Examples of ester-forming phosphorus compounds include polyphosphoric acid, phosphorus pentoxide, phosphoryl chloride and acetyl phosphate. Special substitution patterns may occur when using special phosphorylation agents in particular, for example, phosphoryl chloride. Polyphosphoric acid and phosphorus pentoxide are preferred, but polyphosphoric acid is especially preferred. Mainly monoesters are formed with polyphosphoric acid and monoester/diester mixtures are formed with phosphorus pentoxide. The monoesters are preferred. It is also possible that a mixture of various components to be phosphorylated is used in the phosphorylation reaction.

Reaction of the ester-forming phosphorus compounds with the hydroxyl compounds preferably takes place in the absence of a solvent at temperatures up to 150° C., preferably below 100° C. However, the reaction may also be performed in the presence of suitable inert solvents (for example, methoxypropyl acetate).

The acid functional compounds according to the invention are capable of forming salts due to the acid groups. In the sense of the present invention, they may also be used in the form of the corresponding salts. In some cases, an improved efficacy and/or improved solubility or compatibility can be achieved through such a partial or complete salinization. In applications in which the acidity of the products causes interference, improvements can often be achieved through partial or complete neutralization of the acid functional compounds. Suitable salinization compounds include alkaline (earth) metal salts, such as carbonates, bicarbonates or hydroxides, low-molecular weight amines, such as triethanolamine, diethyl ethanolamine, dibutyl ethanolamine and oleylamine. In addition, salts of the phosphoric acid ester compounds according to the invention with polymeric amines (polyamines, aminic (meth)acrylate copolymers, polyallylamines) are possible as wetting agents and dispersants according to EP-A-0 893 155.

In general different combinations are possible such as partial or complete salinization of monoacidic acid functional compounds with low-molecular weight monoamines as well as with low-molecular weight polyamines or polymeric amines.

Also a partial or complete salinization of polyacidic acid functional compounds with low-molecular weight monoamines as well as with low-molecular weight polyamines or polymeric amines is possible.

One preferred combination is the partial or complete salinizations of monoacidic acid functional compounds with low-molecular weight monoamines or polymeric polyamines. Another preferred combination is the partial or complete salinizations of polyacidic acid functional compounds with low-molecular weight monoamines.

Phosphoric acid groups and phosphoric acid ester groups provide thermostability and a good shelf life. Furthermore, said groups are effective anchoring groups for inorganic pigments.

The acid functional compound according to the present invention might be present in salinized, partially salinized or not salinized form. If it is present in not salinized, salinized and/or partially salinized form, this usually depends first on the respective chemical environment (pH) and second on the type of acid functional compound as such. Monobases and polybases may be considered as salinization components.

Production Method:

As already described above embodiments of the present invention also concerns a method of producing an acid functional compound according to present invention, where in a first step $Y(—X—H)_q$ is used as a polymerization starter and a cyclic ester co-monomer Sm generating the structural unit S is randomly copolymerized with a cyclic ether co-monomer Em generating the structural unit E, where the intermediate product of the first step is according to the formula $Y(—X—W—(H)_c)_q$ which is converted in a second step with an agent providing the moiety Z-a in order to generate the compound according to the general formula (I).

Typically Sm and Em are copolymerized via anionic or cationic polymerization with the proviso that polymerization catalysts are used which provide polymerization reactivities of the used co-monomers which support randomly copolymerization.

Any catalyst that will promote the ring opening polymerization of the described monomers might be used. Representative catalysts include Brönstedt/Lewis acids ($CF_3SO_3CH_3/AlCl_3$, $BF_3$, $ZnCl_2$, rare earth triflates ($Sc(OTf)_3$), guanidines and amidines as for example (1,5,7-triazabicyclo[4.4.0]dec-5-ene (TBD), N-methyl-1,5,7-triazabicyclododecene (MTBD), and 1,8-diazabicyclo[5.4.0]undec-7-ene (DBU), phosphazenes, thiourea-amine, NH-carbenes and enzymes (H. Sardon, A. Pascual, D. Mecerreyes, D. Taton, H. Cramail, J. Hedrick, *Macromolecules* 2015, 48, 3153-3165). Preferred catalyst types are dual catalyst systems like $AlCl_3$/DBU which provide similar reactivities of both monomers (S. Naumann, P.

Scholten, J. Wilson, A. Dove, *J. Am. Chem. Soc.* 2015, 137, 14439-14445).

The catalyst is used in catalytically significant amounts which depends on nature and quantities of reactants, temperature and mixing. Catalyst concentrations of 0.001 to 5 weight percent are typical, with a concentration of 0.01 to 2 weight percent preferred.

A semi batch production in which the more reactive monomer is added during the polymerization reaction might be a further possibility to generate relevant random polymers.

The acid functional compounds according to the invention maybe synthesized in bulk or in the presence of suitable solvents, solvent mixtures or other suitable carrier media, depending on the viscosity. All solvents or carrier media which are not reactive under the selected reaction conditions or whose reactivity with the reactants is negligible and in which the reactants and the reaction products are at least partially soluble are suitable. These include, for example, hydrocarbons, such as toluene, xylene, aliphatic and/or cycloaliphatic petroleum fractions, chlorinated hydrocarbons, such as chloroform, trichloroethane, acyclic ethers, polyalkylene glycol dialkyl ethers, such as dipropylene glycol dimethyl ether, esters of mono-, di- or polycarboxylic acids, such as ethyl acetate, butyl acetate, triacetin, phthalates or other plasticizers, dialkyl esters of $C_2$-$C_4$ dicarboxylic acids that are referred to as “dibasic ester”, alkyl glycol esters, such as ethyl glycol acetate, methoxypropyl acetate, ketones, such as methyl isobutyl ketone, cyclohexanone, acetone, acid amides, such as dimethylformamide and the like. Suitably, the solvent(s) and/or the carrier media is/are already selected by taking into account the planned field of use.

Depending on the field of application, solvents may be used or not. In the case solvents are used, they may remain in the acid functional compound or may be removed entirely or partially and replaced by other solvents or carrier media, if necessary.

The solvent may be removed entirely or partially by distilling it off, optionally under reduced pressure and/or azeotropically with the addition of water, for example. However, the acid functional compounds may also be isolated by precipitation by adding non-solvents, such as aliphatic hydrocarbons, e.g., hexane and then isolated by separation by filtration and optionally drying. The acid functional compounds obtained by any of these methods may then be dissolved in a solvent suitable for the respective field of application or may optionally be used in pure form, for example, in powder coatings or applied to inert carriers. For applications in which the use of solids is preferred, such as powder coatings or certain plastics processing methods, the acid functional compounds may also be converted to a solid form by additional known methods. Examples of such methods include microencapsulation, spray drying, adsorption onto a solid carrier, such as $SiO_2$, or PGSS methods (particles from gas-saturated solutions).

The invention also concerns using acid functional compounds as described above or produced as described above as an additive, preferably as a wetting and dispersing agent, preferably in coatings, paints, plastics, pigment pastes, sealants, ceramics, cosmetics, adhesives, casting compounds, fillers, battery applications, gas and oilfield applications, spackling compounds, inks and printing colors.

The present invention also relates to a solid mixture containing inorganic particles and/or inorganic fibers that have been treated with an acid functional compound as described above or with an acid functional compound produced as describe above.

A further subject of the invention is a coating and/or plastic containing an acid functional compound as described above or an acid functional compound produced as described above.

The acid functional compounds according to the invention are used, for example, as aluminum passivators, dispersants, dispersion stabilizers or wetting agents and can be used, for example, in pigmented and/or filler-containing products, for example, pigment concentrates or pastes, coating compositions, sealants, plastics, ceramics, cosmetics, adhesives, casting compounds, spackling compounds, inks and/or printing inks. Preferred pigment concentrates are those which can be mixed with appropriate paint systems, thereby producing pigmented paints.

The aforementioned acid functional compounds may thus be used, for example, in the production or processing of paints, coatings, inks and printing colors, for example, for ink jet printing, paper coatings, leather and textile inks, pastes, pigment concentrates, ceramics, adhesives and sealants, casting compounds, plastics and cosmetic preparations, in particular when these contain solids, such as pigments and/or fillers (also fibrous). The aforementioned acid functional compounds may also be used in the production or processing of molding compounds based on synthetic, semi-synthetic or natural macromolecular substances, such as polyvinyl chloride, saturated or unsaturated polyesters, polyurethanes, polystyrenes, polyacrylates, polyamides, epoxy resins, polyolefins, for example, polyethylene or polypropylene. The acid functional compounds also may be used to produce, for example, casting compounds, potting materials, PVC plastisols, gel coats, polymer concrete, circuit boards, industrial paints, wood and furniture paints, automotive paints and enamels, (antifouling) marine paints, anticorrosion paints, can and coil coatings or painter and architectural paints.

The acid functional compounds according to the invention may be used not only in paint systems for pigmented paints but use in a wide range of formulations and/or products, such as resins, oils, greases, lubricants, rubbers, sealants, printing colors, inks, adhesives, waxes or coating compositions is also possible. The acid functional compounds may also be used in formulations, which are prepared in the personal care industry or in electrical applications in the electronics industry, in the shipbuilding industry, within the context of medical applications, in the construction industry or in the automotive industry. Examples include electronic paper, such as the display in e-books, encapsulation of microelectronic chips and circuit boards, underwater hull coatings, such as anti-fouling coatings, silicone tubes or lubricant additives for brake components.

The acid functional compounds according to the invention may advantageously also be used in the production of color filters for liquid crystal displays, liquid crystal screens, color resolution devices, sensors, plasma display screens, displays based on SED (surface conduction electron emitter display)

and for MLCC (multilayer ceramic compounds). The MLCC technology is used in the production of microchips, multi layer ceramic capacitors and circuit boards.

The use in cosmetic preparations may serve, for example, the manufacture of cosmetic preparations such as make-up, powder, lipstick, hair dye, creams, nail polish and sunscreen preparations. These may be present in the usual forms, such as W/O or O/W emulsions, solutions, gels, creams, lotions or sprays. Advantageously, the acid functional compounds according to the invention can be used in dispersions used for producing these compositions. They may contain the carrier media typically used for these purposes in cosmetics, such as water, castor oils or silicone oils and solids, such as organic and inorganic pigments such as titanium dioxide or iron oxide.

Other fields of application worth mentioning include NIP (non-impact printing), inkjet (on paper, foil, ceramic, artificial and natural fiber fabrics), dispersing ceramic (aqueous or anhydrous), dispersing in potting materials. The acid functional compounds according to the invention can also be used as such, i.e., without having been previously incorporated into a corresponding concentrate, in the formulations and fields of applications mentioned above.

Typically, the product containing the acid functional compounds, as well as pigments and/or fillers, is a paint, or a pigment concentrate for coating compositions. Ultimately, however, the use of said acid functional compounds is possible in any pigment-containing and/or filler-containing products.

The pigment concentrates are in particular compositions that contain, for example, water and/or organic solvents and at least one pigment in addition to the acid functional compounds according to the invention. These pigment concentrates in particular may contain additionally fillers and organic polymers as binders. Typically pigment concentrates contain no or only small portions of organic polymers as a binder. Such known binders are advantageously present in the corresponding final paint systems and are described below.

Suitable organic solvents are in particular those typically used in the field of paint and dye industry and which are known to those skilled in the art such as aliphatic solvents, cycloaliphatic solvents, aromatic solvents, such as toluene, xylene, solvent naphtha, ethers, esters and/or ketones, for example, butyl glycol, butyl diglycol, butyl acetate, methyl isobutyl ketone, methyl ethyl ketone and/or solvents such as methoxypropyl acetate, diacetone alcohol.

The pigments used may be the pigments known to those skilled in the art. Examples of suitable pigments include mono-, di-, tri- and polyazo pigments, oxazine, dioxazine, thiazine pigments, diketo pyrrolopyrroles, phthalocyanines, ultramarine and other metal complex pigments, indigoid pigments, diphenylmethane pigments, triarylmethane pigments, xanthene pigments, acridine pigments, quinacridone pigments, methine pigments, anthraquinone, pyranthrone, perylene pigments and other polycyclic carbonyl pigments, carbon black pigments and/or pigments based on carbon black, such as graphite. Further examples of organic pigments can be found in the monograph: W. Herbst, K. Hunger "*Industrial Organic Pigments*", 1997 (Verlag: Wiley-VCH, ISBN: 3-527-28836-8). The pigments used may be inorganic pigments, such as zinc, titanium dioxide, zinc oxide, zinc sulfide, zinc phosphate, barium sulfate, lithophones, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth vanadate molybdate yellow or chromium titanium yellow), Further examples can be found in the monograph: G. Buxbaum "*Industrial Inorganic Pigments*", 1998 (Verlag: Wiley-VCH, ISBN: 3-527-28878-3). Inorganic pigments can be magnetic pigments based on pure iron, iron oxides and chromium oxides or mixed oxides, metallic effect pigments of aluminum, zinc, copper or brass as well as pearlescent pigments or fluorescent and phosphorescent pigments. Other examples include nanoscale organic or inorganic solids with particle sizes of less than 100 nm in at least one dimension, such as certain types of carbon black or other allotropic forms of carbon, such as single-wall CNTs, multiwall CNTs and graphene. The particle size is determined, for example, by means of transmission electron microscopy, analytical ultracentrifugation or light scattering methods. Particles consisting of a metal oxide and/or hydroxide or a semimetal oxide and/or hydroxide as well as particles consisting of mixed metal oxides and/or hydroxides and/or semimetal oxides and/or hydroxides may also be mentioned. For example, the oxides and/or oxide hydroxides of aluminum, silicon, zinc, titanium, etc. may be used for the production of such extremely finely divided solids. The process for producing these oxidic and/or hydroxidic and/or oxide hydroxidic particles may involve a variety of methods, such as, for example, ion exchange processes, plasma processes, sol-gel methods, precipitation, comminution (e.g. by grinding) or flame hydrolysis. All the pigments mentioned above may also be present in a surface-modified form and may have basic, acidic or neutral groups at the surface.

Where the respective products, especially the coating compositions, contain fillers, the fillers are, for example, fillers known to the person skilled in the art. Examples of powdery or fibrous fillers are, for example, those which are composed of powdery or fibrous particles of alumina, aluminum hydroxide, silica, diatomaceous earth, siliceous earth, quartz, silica gel, talc, kaolin, mica, perlite, feldspar, slate flour, calcium sulfate, barium sulfate, calcium carbonate, calcite, dolomite, glass or carbon. The fibers used may be organic and/or inorganic in nature and are also used as reinforcement materials. Other examples of pigments or fillers may be found, for example, in the U.S. Pat. No. 4,795,796 A. Flame retardants, such as aluminum or magnesium hydroxide, and matting agents, such as silicas, can also be dispersed and stabilized particularly well by the wetting agents and dispersants according to the invention.

The acid functional compounds according to the invention can also be used for surface treatment of fibers or particles, such as pigments or fillers to improve their processing properties or compatibility.

The acid functional compounds according to the invention are also particularly suitable for the production of solid concentrates, such as pigment concentrates. For this purpose the acid functional compounds according to the invention are presented in a carrier medium such as organic solvents, plasticizers and/or water, and the solids to be dispersed are added with stirring. In addition, these concentrates may contain binders and/or other excipients. Using the acid functional compounds according to the invention, it is possible, in particular, to produce stable binder-free pigment concentrates. Using the acid functional compounds according to the invention it is also possible to produce flowable solid concentrates from pigment press cakes. For this purpose, the acid functional compound according to the invention is mixed with the press cake, which can still contain organic solvents, plasticizers and/or water, and the mixture thus obtained is dispersed. The solid concentrates produced by different routes can then be incorporated in different substrates such as, for example, alkyd resins, polyester resins, acrylate resins, polyurethane resins or epoxy resins. Pigments can also be dispersed without solvent directly in the acid functional compounds according to the invention and are particularly suitable for pigmenting thermoplastic and thermosetting plastics formulations.

Depending on the field of application, the acid functional compounds according to the invention are used in amounts such that the product ultimately interesting for further application contains a proportion of the wetting agent and dispersant according to the invention advantageously from 0.01 to 10% by weight, based on the total amount of the respective product. However, even larger amounts are also possible. Based on the solid to be dispersed, for example, the pigment, the additive composition according to the invention is used in an amount of preferably 0.5-100% by weight. When using solids that are difficult to stabilize, the amount of wetting agent and dispersant according to the invention may be much higher. The concentration of dispersant needed depends in general on the specific surface area of the solid to be dispersed. Thus, for example, it may be important to know which pigment is involved. Generally, it can be stated that the stabilization of inorganic pigments generally requires less dispersant than is required for stabilizing organic pigments, as the latter tend to have a higher specific surface and therefore require a larger amount of dispersant. Typical doses of the wetting agent and dispersant for inorganic pigments are 1 to 30 wt. %, for organic pigments 10 to 50 wt. %, each based on the solid to be dispersed, in particular the pigment. In case of very finely divided pigments, for example, some carbon blacks, added amounts of 30 to 90% or more are needed. The criteria for sufficient pigment stabilization can include, for example, gloss and transparency of the coating compositions, or the degree of floating. The dispersion of the solids can take place as grinding a single solid or as grinding a mixture of multiple pigments simultaneously, with the best results usually being achieved with grinding a single solid. Using mixtures of different solids may increasingly result in agglomerations in the liquid phase due to opposing charges on the surface of the solids. In these cases a uniform, usually positive, charge of all the particles can be achieved when using the acid functional compounds according to the invention, and therefore instabilities due to differences in charge can be prevented. The dispersants achieve their optimal effect when added to the ground material, especially when first the solid to be dispersed is only mixed with the additive and optionally solvents ("premix"), since then, the additive can preferentially adsorb to the solid surface, without having to compete with the binder polymers. In practice, however, this procedure is only necessary in exceptional cases. If necessary, the acid functional compounds according to the invention may also be used later (as so-called "post-additives") to solve floating or flocculation issues in an already finalized batch, for example. In this case, however, usually higher additive doses are required. The products, in particular the coating compositions and/or paints, in which the acid functional compounds according to the invention should ultimately manifest their effects, may also contain an organic polymer as a binder. Those skilled in the art are familiar with such binders. Said at least one binder may be introduced, for example, by means of a paint system, which is mixed, for example, with a pigment concentrate containing the acid functional compounds according to the invention, so that the product in question is a pigmented paint. However, other pigmented and/or filler-containing products based on an organic polymer matrix are also possible, for example, plastics, sealants and other products known to the person skilled in the art. A product may be regarded as a system containing a polymer resin and/or an organic polymer as binder, so the product is capable of forming a solid organic polymer matrix (for example, a coating composition) under suitable curing conditions. Also referred to as product is a system that by simple mixing with a component which contains a binder can form such organic polymeric matrix (for example, a pigment concentrate). For example, but not limited to, alkyd resins, polyester resins, acrylate resins, polyurethane resins, cellulose nitrates, cellulose acetobutyrates, melamines, chlorinated rubbers and/or epoxy resins, known to the person skilled in the art, may also be used. Examples of water-based coatings include cathodic or anodic electrodeposition paints, for example, for automobile bodies. Other examples include plasters, silicate paints, emulsion paints, water-based paints based on water-dilutable alkyds, alkyd emulsions, hybrid systems, two-component systems, polyurethane and acrylate dispersions. Both one-component systems and two-component systems are possible, wherein in the latter case, in general, also polyisocyanates, melamine resins and/or polyamide resins are present in the second component as the typical crosslinking agents known to the person skilled in the art. Product systems, in particular coating compositions, that contain an acrylate resin as binder are preferred. Another variant is a two-component (2C) coating composition and/or a two-component (2C) paint, which contains an epoxy resin in the binder component and an amine functional resin in the crosslinking component. The coating compositions that are preferred as the products may be water-based or solvent-based. Water-based is to be understood that the coating composition contains mainly water as a solvent. A water-based coating composition in particular will contain not more than 10 wt. % organic solvent, based on the total amount of solvent present in the coating composition. A coating composition containing not more than 5 wt. %, preferably not more than 2 wt. % of water, based on the total amount of solvents, is considered to be solvent-based.

For example, photoinitiators, defoamers, wetting agents, film-forming additives, such as cellulose derivatives (for example, cellulose nitrates, cellulose acetates, cellulose acetobutyrate), reactive diluents, flow control agents, dispersants and/or rheology-controlling additives may be used as additional product components, for example.

The pigment concentrates and coating composition preferred as products according to the invention are produced by methods known to the person skilled in the art. The known methods are used, such as, for example, stepwise addition, while stirring and mixing the components of the coating composition in conventional mixing equipment, such as stirred vessels or dissolvers.

Coatings and/or paint layers can be produced by using the preferred pigment concentrates and coatings compositions. The coating is performed by using the application techniques known to the person skilled in the art applying the coating to a substrate and subsequent curing.

The application is carried out, for example, by the known spray, spraying, brushing, rolling, casting, impregnating and/or dipping methods. After application of the coating composition onto a substrate, the curing or drying is carried out by conventional methods. For example, the applied coating composition may be curable by physically drying, thermally and/or by applying actinic radiation (radiation-curing), preferably UV radiation, and electron beams, for example. Thermal curing can take place for example in the range of about 10° C. to about 400° C., depending on the type of coating composition and/or the substrate. In each individual case, the duration of the curing depends, for example, on the type of curing method (thermal or actinical), the type of coating composition used and/or the substrates. For this purpose, the substrate may be in motion or at rest.

In addition to the application above described as dispersants and/or coating agents for powdery and fibrous solids, acid functional compounds according to the invention may also be used as viscosity reducers and compatibilizers in synthetic resins. Examples of such synthetic resins include the so-called "sheet molding compounds" (SMC) and "bulk molding compounds" (BMC), which consist of unsaturated polyester resins having a high filler and fiber content. Their production and processing is exemplified in U.S. Pat. No. 4,777,195 A. An issue in SMC and BMC resin mixtures is often the addition of polystyrene (PS) to the formulation in order to reduce the shrinkage during processing. PS is not compatible with the unsaturated polyester resins used and thus resulting in the separation of the components. When using PS-filled SMC or BMC mixtures, the acid functional compounds, preferably the acidic phosphoric acid ester functional compounds according to the invention may, due to their good dispersing qualities, lead to a compatibilization effect between PS and unsaturated polyester resin, which increases the storage stability and process reliability of such mixtures.

Phase transfer effects can be achieved by means of the acid functional compounds according to the invention, for example, in incompatible polyol mixtures, polyol-isocyanate mixtures or polyol-propellant mixtures (such as are used in the production of polyurethane).

The invention will be explained in more detail below, using examples.

EXAMPLES

General Remarks

In the case of substances without molecular uniformity the stated molecular weights—below as already in the foregoing description—represent average values of the numerical mean. The molecular weights or number-average molecular weights $M_n$, are determined, when titratable hydroxyl or amino groups are present, by end-group determination via the determination of the OH number or amine number, respectively. In the case of compounds to which an end-group determination cannot be applied, the number-average molecular weight is determined by means of gel permeation chromatography against a polystyrene standard. Unless otherwise remarked percentages are percentages by weight.

Measurement of Non-volatile Components

The sample (2.0±0.1 g of the tested substance) was weighed in a previously dried aluminum crucible and dried in furnace for 20 minutes at 150° C., cooled in a desiccator and then reweighed. The residue corresponds to the solids content in the sample (ISO 3251).

Measurement of Acid Numbers

The acid number is the KOH quantity in mg that is required for neutralizing 1 g of substance under the defined conditions. The acid numbers were determined by a neutralization reaction with a 0.1 N KOH in Ethanol according to DIN EN ISO 2114.

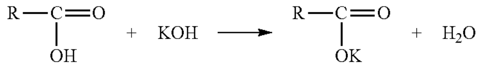

Measurement of Hydroxyl Numbers

The alcoholic hydroxyl groups were reacted by acetylation with an excess of acetic anhydride. The excess acetic anhydride was cracked into acetic acid by adding water and titrated back using ethanolic KOH. The hydroxyl number was understood to be the KOH quantity in mg, which is equivalent to the acetic acid quantity bound when acetylating 1 g of substance.

Measurement of Amine Numbers

Perchloric acid ($HClO_4$) in acetic acid has proved to be a suitable titration agent for organic bases containing nitrogen as well as primary, secondary and tertiary amine groups. Acid solvents such as acetic acid have stood the test in determining weak organic bases (good dissolving properties, proton-donating acid solvent). Additions of inert solvents such as cyclohexane, dioxane, chlorobenzene, acetone and methyl ethyl ketone can improve the titration of very weak bases.

$$R—NH_2+HClO_4 \rightarrow R—NH_3^+ClO_4^-$$

Measurement of Anhydride Acid Number

The anhydride groups were reacted with an excess of a primary amine to form a carboxylic acid and an amide. The excess primary amine was then titrated back with isopropanolic hydrochloric acid.

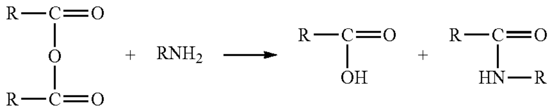

DSC Measurements

This test method is applicable to copolymerization products which melting point and crystallization behavior is detectable under the specified conditions. The measurements were carried out on DSC Q2000 (TA Instruments) using aluminum crucible with cover, micro scale and platen press according to the manual and the manufacturer's instructions. The initial weight of the sample should be selected between 5 and 15 mg. For better handling, the sample was melted and accurately weighed into an aluminum crucible. The crucible was sealed with a perforated aluminum lid with the press and inserted into the sample plate. The measurement was carried out with the heating rate of 10° C./min.

The two measuring cycles (heating and cooling) were plotted and analyzed together in one diagram: On the abscissa was entered the temperature and on the ordinate the heat flow. If superimposed signals were recognized it was evaluated in such a way that several peak maxima can be read off.

NMR Measurements

The NMR measurements were carried out on a Bruker DPX 300 at 300 MHZ ($^1$H) or 75 MHZ ($^{13}$C). Solvents used were deuterated chloroform ($CDCl_3$) and deuterated dimethyl sulfoxide (DMSO-$d_6$).

Preparation of the Intermediate Products: First Step

Examples According to the Invention

Preparation method 1

A clean dry four-necked flask (500 ml) equipped with a condenser, KPG-stirrer, temperature sensor and a nitrogen line was charged with component $Y(—X—H)_q$ (abbreviation in the table: " component Y—X1") and the mixture of catalysts and heated up to 110° C. until the catalyst mixture was dissolved. A mixture of the lactone Sm (abbreviation in the table "component S") and the epoxide Em (abbreviation in the table "component E1-1") was added into the component Y—X1 so that the temperature did not exceed 120° C. After complete addition the reaction mixture was heated up to 140° C. and stirred at that temperature until the epoxide was completely reacted (controlled by the means of NMR) and the content of non-volatile components was >98% (measurement of non-volatile components according to ISO 3251).

TABLE 1 intermediate products prepared according to the method 1

| Intermedio | component Y-X1 | wt. % Y-X1 | component S | wt. % S | component E1-1 | wt. % E1-1 | catalyst | wt. % catalyst |
|---|---|---|---|---|---|---|---|---|
| Y-X1-W01 | MPEG 350 | 35.34 | CAPA | 34.70 | C12-C14-AlkylGE | 29.34 | $AlCl_3$/DBN | 0.52/0.10 |
| Y-X1-W02 | MPEG 350 | 31.58 | CAPA | 41.41 | C12-C14-AlkylGE | 26.29 | $AlCl_3$/DBN | 0.61/0.11 |
| Y-X1-W03 | MPEG 350 | 28.59 | CAPA | 46.82 | C12-C14-AlkylGE | 23.77 | $AlCl_3$/DBN | 0.69/0.13 |
| Y-X1-W04 | MPEG 500 | 34.10 | CAPA | 45.75 | C12-C14-AlkylGE | 19.35 | $AlCl_3$/DBN | 0.67/0.13 |
| Y-X1-W05 | MPEG 750 | 46.16 | CAPA | 35.23 | C12-C14-AlkylGE | 17.99 | $AlCl_3$/DBN | 0.52/0.10 |
| Y-X1-W06 | MPEG 750 | 43.12 | CAPA | 39.50 | C12-C14-AlkylGE | 16.70 | $AlCl_3$/DBN | 0.58/0.10 |
| Y-X1-W07 | MPEG 350 | 34.76 | CAPA | 45.54 | 2-EHGE | 18.75 | $AlCl_3$/DBN | 0.80/0.15 |
| Y-X1-W08 | MPEG 350 | 28.32 | CAPA | 55.67 | 2-EHGE | 15.06 | $AlCl_3$/DBN | 0.80/0.15 |
| Y-X1-W09 | MPEG 350 | 20.17 | CAPA | 46.22 | 2-EHGE | 32.65 | $AlCl_3$/DBN | 0.81/0.15 |
| Y-X1-W10 | MPEG 500 | 48.53 | CAPA | 32.1 | 2-EHGE | 17.90 | $AlCl_3$/DBN | 0.81/0.15 |
| Y-X1-W11 | MPEG 500 | 17.17 | CAPA | 69.21 | 2-EHGE | 12.67 | $AlCl_3$/DBN | 0.80/0.15 |
| Y-X1-W12 | MPEG 500 | 14.30 | CAPA | 32.00 | 2-EHGE | 52.75 | $AlCl_3$/DBN | 0.80/0.15 |
| Y-X1-W13 | MPEG 500 | 10.80 | CAPA | 48.40 | 2-EHGE | 39.85 | $AlCl_3$/DBN | 0.80/0.15 |
| Y-X1-W14 | MPEG 750 | 57.95 | CAPA | 26.52 | 2-EHGE | 14.58 | $AlCl_3$/DBN | 0.80/0.15 |
| Y-X1-W15 | MPEG 750 | 53.15 | CAPA | 32.45 | 2-EHGE | 13.36 | $AlCl_3$/DBN | 0.89/0.15 |

MPEG (number) = methoxy polyethylene glycol (molecular weight in g/mol),
CAPA = ε-Caprolactone,
2-EHGE = 2-ethylhexyl glycidyl ether,
C12-C14-AlkylGE = C12-C14 alkyl glycidyl ether,
DBN = 1,5-Diazabicyclo(4.3.0)non-5-ene,
$AlCl_3$ = aluminum trichloride Preparation Method 2

A clean dry four-necked flask (500 mL) equipped with condenser, KPG-stirrer, temperature sensor and a nitrogen line was charged with a mixture of the lactone Sm (abbreviation in the table: "component S") and the epoxide Em (abbreviation in the table "component E1-1") and heated up to 80° C. Then a polyamine $Y(—X—H)_q$ (abbreviation in the table "component Y—X2") was slowly added into this mixture. After complete addition the mixture was heated up to 140° C. and stirred for 2 h. Then the reaction mixture was cooled down to 40° C., the catalysts were added and the temperature was increased up to 140° C. The incorporation of epoxide and the lactone monomers was determined by the means of NMR.

TABLE 2

Intermediate products prepared according to the method 2

| Intermedio | component Y-X2 | wt. % Y-X2 | component S | wt. % S | component E1-1 | wt. % E1-1 | catalyst | wt. % catalyst |
|---|---|---|---|---|---|---|---|---|
| Y-X2-W01 | PEI300 | 3.72 | CAPA | 55.88 | 2-EHGE | 39.45 | $AlCl_3$/DBN | 0.80/0.15 |
| Y-X2-W02 | PEI300 | 1.23 | CAPA | 53.60 | 2-EHGE | 44.22 | $AlCl_3$/DBN | 0.80/0.15 |
| Y-X2-W03 | PEI300 | 8.12 | VAL | 61.88 | 2-EHGE | 29.05 | $AlCl_3$/DBN | 0.80/0.15 |
| Y-X2-W04 | PEI300 | 3.91 | VAL | 67.13 | 2-EHGE | 28.01 | $AlCl_3$/DBN | 0.80/0.15 |
| Y-X2-W05 | PEI300 | 4.41 | CAPA | 67.10 | CGE | 27.54 | $AlCl_3$/DBN | 0.80/0.15 |
| Y-X2-W06 | PEI300 | 6.51 | CAPA | 56.63 | C12-C14-AlkylGE | 35.91 | $AlCl_3$/DBN | 0.80/0.15 |
| Y-X2-W07 | PEI300 | 3.02 | CAPA | 46.01 | C12-C14-AlkylGE | 50.02 | $AlCl_3$/DBN | 0.80/0.15 |
| Y-X2-W08 | PEI 1300 | 7.46 | CAPA | 64.88 | 2-EHGE | 26.71 | $AlCl_3$/DBN | 0.80/0.15 |
| Y-X2-W09 | PEI 1300 | 4.33 | CAPA | 47.02 | C12-C14-AlkylGE | 47.70 | $AlCl_3$/DBN | 0.80/0.15 |

TABLE 2-continued

| Intermediate products prepared according to the method 2 | | | | | | | | |
|---|---|---|---|---|---|---|---|---|
| Intermedio | component Y-X2 | wt. % Y-X2 | component S | wt. % S | component E1-1 | wt. % E1-1 | catalyst | wt. % catalyst |
| Y-X2-W10 | PEI 1300 | 6.61 | CAPA | 71.80 | CGE | 20.64 | $AlCl_3$/DBN | 0.80/0.15 |
| Y-X2-W11 | PEI 2000 | 4.67 | CAPA | 60.93 | 2-EHGE | 33.45 | $AlCl_3$/DBN | 0.80/0.15 |
| Y-X2-W12 | PEI 2000 | 5.70 | CAPA | 61.94 | C12-C14-AlkylGE | 31.42 | $AlCl_3$/DBN | 0.80/0.15 |
| Y-X2-W13 | PEI 2000 | 9.30 | CAPA | 60.68 | CGE | 29.07 | $AlCl_3$/DBN | 0.80/0.15 |
| Y-X2-W14 | PEI 2000 | 3.67 | CAPA | 55.91 | 2-EHGE | 39.47 | $AlCl_3$/DBN | 0.80/0.15 |

PEI (number) = polyethylenimine (molecular weight),
VAL = delta-Valerolactone,
CAPA = ε-Caprolactone,
2-EHGE = 2-ethylhexyl glycidyl ether,
CGE = o-cresyl glycidyl ether,
C12-C14-AlkylGE = C12-C14 alkyl glycidyl ether,
DBN = 1,5-Diazabicyclo(4.3.0)non-5-ene,
$AlCl_3$ = aluminum trichloride Preparation Method 3

The alkoxylation was carried out in a pressure reactor equipped with a stirrer and a thermostat. Component Y(—X—H)$_q$ (abbreviation in the table "component Y—X1") and the catalyst was introduced into the reactor, and the reactor was closed, evacuated and rendered inert with nitrogen. The water (formed as a by-product in the reaction of potassium hydroxide with the alcohol used as a starter) in the reactor was evacuated under reduced pressure and the reactor rendered inert with nitrogen again. After heating to 135° C., a mixture of component Sm (abbreviation in the table "component S") and component Em (abbreviation in the table "component E1-2") were metered in at a rate such that a maximum pressure of 5 bar was not exceeded. After complete addition and subsequent reaction at 135° C. until the pressure remained constant, cooling took place to room temperature following with de-alkalization with an acidic cation exchanger resin (Amberlite® IR-120 (H) purchased from Sigma-Aldrich).

TABLE 3

| Intermediate products prepared according to the method 3 | | | | | | | | |
|---|---|---|---|---|---|---|---|---|
| Intermedio | component Y-X1 | wt. % Y-X1 | component S | wt. % S | component E1-2 | wt. % E1-2 | catalyst | wt. % catalyst |
| Y-X1-W16 | MPEG 350 | 46.40 | CAPA | 45.40 | PO | 7.70 | KOH | 0.50 |
| Y-X1-W17 | MPEG 500 | 44.56 | CAPA | 49.86 | PO | 5.08 | KOH | 0.50 |
| Y-X1-W18 | MPEG 350 | 47.29 | CAPA | 46.26 | EO | 5.95 | KOH | 0.50 |
| Y-X1-W19 | MPEG 500 | 48.12 | VAL | 47.23 | EO | 4.15 | KOH | 0.50 |
| Y-X1-W20 | MPEG 350 | 48.20 | VAL | 41.36 | BuO | 9.94 | KOH | 0.50 |
| Y-X1-W21 | MPEG 500 | 46.87 | VAL | 46.00 | BuO | 6.63 | KOH | 0.50 |

MPEG (number) = methoxy polyethylene glycol (molecular weight in g/mol),
CAPA = ε-Caprolactone,
VAL = delta-Valerolactone,
PO = propylene oxide,
EO = ethylene oxide,
BuO = 1,2-Epoxybutane,
KOH = potassium hydroxide Preparation Method 4

A clean dry four-necked flask (500 ml) equipped with a condenser, KPG-stirrer, temperature sensor and a nitrogen line was charged with component Y(—X—H)$_q$ (abbreviation in the table "component Y—X1") and the catalyst and heated up to 80° C. A mixture of the lactone Sm (abbreviation in the table "component S") with a oxetane Em (abbreviation in the table "component E2") was slowly added into the component Y(—X—H)$_q$ (abbreviation in the table "component Y—X1") so that the temperature did not exceed 85° C. The incorporation of oxetane and the lactone monomers was evaluated by the means of NMR.

TABLE 4

| Intermediate products prepared according to the method 4 | | | | | | | | |
|---|---|---|---|---|---|---|---|---|
| Intermedio | component Y-X1 | wt. % Y-X1 | component S | wt. % S | component E2 | wt. % E2 | catalyst | wt. % catalyst |
| Y-X1-W22 | MPEG 500 | 52.60 | CAPA | 35.32 | TMPOx | 11.98 | TfOH | 0.10 |
| Y-X1-W23 | MPEG 500 | 54.99 | VAL | 32.38 | TMPOx | 12.53 | TfOH | 0.10 |
| Y-X1-W24 | MPEG 350 | 37.18 | CAPA | 36.38 | 3EO-TMPOx | 26.34 | TfOH | 0.10 |

MPEG (number) = methoxy polyethylene glycol (molecular weight in g/mol,
TMPOx = 3-ethyl-3-(hydroxymethyl) oxetane,
3EO-TMPOx = 3-Ethyl-3-(hydroxymethyl)oxetan, ethoxylated with average 3,3 mol ethylenoxide,
TfOH = Trifluoromethanesulfonic acid,
VAL = delta-Valerolactone,
CAPA = ε-Caprolactone Preparation of the Acid Functional Compounds Y(—X—W—$(Z)_c)_q$: Second Step Preparation Method 5

A clean dry four-necked flask (250 mL) with condenser, KPG-stirrer, temperature sensor and a nitrogen line was charged with component Y(—X—W—$(H)_c)_q$ (abbreviation in the table "component Y—X1—W") and heated up to 50° C. Then the polyphosphoric acid (abbreviation in the table "component Z1") was slowly added to the mixture. After complete addition, the mixture was heated up to 80° C. and stirred 4 h at this temperature. The degree of completion was controlled by measurement of acid number.

TABLE 5

| Products prepared according to the method 5 | | | | |
|---|---|---|---|---|
| Product | component Y-X1-W | wt. % Y-X1-W | component Z1 | wt % Z1 |
| Y-X1-W01-Z1 | Y-X1-W01 | 89.80 | PPS | 10.20 |
| Y-X1-W02-Z1 | Y-X1-W02 | 90.84 | PPS | 9.16 |
| Y-X1-W03-Z1 | Y-X1-W03 | 91.57 | PPS | 8.43 |
| Y-X1-W04-Z1 | Y-X1-W04 | 92.97 | PPS | 7.03 |
| Y-X1-W05-Z1 | Y-X1-W05 | 93.51 | PPS | 6.49 |
| Y-X1-W06-Z1 | Y-X1-W06 | 93.95 | PPS | 6.05 |
| Y-X1-W07-Z1 | Y-X1-W07 | 89.93 | PPS | 10.07 |
| Y-X1-W08-Z1 | Y-X1-W08 | 91.66 | PPS | 8.34 |
| Y-X1-W09-Z1 | Y-X1-W09 | 93.89 | PPS | 6.11 |
| Y-X1-W10-Z1 | Y-X1-W10 | 90.39 | PPS | 9.61 |
| Y-X1-W11-Z1 | Y-X1-W11 | 96.38 | PPS | 3.62 |
| Y-X1-W12-Z1 | Y-X1-W12 | 96.93 | PPS | 3.07 |
| Y-X1-W13-Z1 | Y-X1-W13 | 97.66 | PPS | 2.34 |
| Y-X1-W14-Z1 | Y-X1-W14 | 92.02 | PPS | 7.98 |
| Y-X1-W15-Z1 | Y-X1-W15 | 92.63 | PPS | 7.37 |
| Y-X1-W16-Z1 | Y-X1-W16 | 87.00 | PPS | 13.00 |
| Y-X1-W17-Z1 | Y-X1-W17 | 90.88 | PPS | 9.12 |
| Y-X1-W18-Z1 | Y-X1-W18 | 86.79 | PPS | 13.21 |
| Y-X1-W19-Z1 | Y-X1-W19 | 90.22 | PPS | 9.78 |
| Y-X1-W20-Z1 | Y-X1-W20 | 86.57 | PPS | 13.43 |
| Y-X1-W21-Z1 | Y-X1-W21 | 90.45 | PPS | 9.55 |
| Y-X1-W22-Z1 | Y-X1-W22 | 74.70 | PPS | 25.30 |
| Y-X1-W23-Z1 | Y-X1-W23 | 80.14 | PPS | 19.86 |
| Y-X1-W24-Z1 | Y-X1-W24 | 80.69 | PPS | 19.31 |

PPS = polyphosphoric acid 85% available from Merck KGaA

Preparation Method 6

A clean dry four-necked flask (250 mL) with condenser, KPG-stirrer, temperature sensor and a nitrogen line was charged with component Y(—X—W—$(H)_c)_q$ (abbreviation in the table "component Y—X2—W") and an anhydride (abbreviation in the table "component Z2"). The mixture was heated up to 110° C. and stirred at this temperature until the anhydride acid number reached 0-3 mg KOH/g.

TABLE 6

| Products prepared according to the method 6 | | | | |
|---|---|---|---|---|
| Products | component Y-X2-W | wt. % Y-X2-W | component Z2 | wt. % Z2 |
| Y-X2-W01-Z2 | Y-X2-W01 | 95.21 | BSA | 4.79 |
| Y-X2-W02-Z2 | Y-X2-W02 | 96.56 | BSA | 3.44 |
| Y-X2-W03-Z2 | Y-X2-W03 | 90.18 | MSA | 9.82 |
| Y-X2-W04-Z2 | Y-X2-W04 | 95.02 | BSA | 4.98 |
| Y-X2-W05-Z2 | Y-X2-W05 | 94.42 | PSA | 5.58 |
| Y-X2-W06-Z2 | Y-X2-W06 | 91.97 | BSA | 8.03 |
| Y-X2-W07-Z2 | Y-X2-W07 | 96.11 | BSA | 3.89 |
| Y-X2-W08-Z2 | Y-X2-W08 | 90.91 | MSA | 9.09 |
| Y-X2-W09-Z2 | Y-X2-W09 | 94.51 | BSA | 5.49 |
| Y-X2-W10-Z2 | Y-X2-W10 | 91.86 | PSA | 8.14 |
| Y-X2-W11-Z2 | Y-X2-W11 | 94.11 | MSA | 5.89 |
| Y-X2-W12-Z2 | Y-X2-W12 | 92.90 | BSA | 7.10 |
| Y-X2-W13-Z2 | Y-X2-W13 | 88.91 | PSA | 11.09 |
| Y-X2-W14-Z2 | Y-X2-W14 | 95.31 | MSA | 4.69 |

BSA = succinic anhydride,
MSA = maleic anhydride,
PSA = phthalic anhydride

Comparative Examples (not According to the Invention)

Examples prepared not according to the invention are marked with (*).

Preparation Method 7

A clean dry four-necked flask (500 ml) equipped with a condenser, KPG-stirrer, temperature sensor and a nitrogen line was charged with component Y(—X—$H)_q$ (abbreviation in the table "component Y—X1") and a mixture of catalysts and heated up to 110° C. Then the epoxide Em (abbreviation in the table "component E1-1") was slowly added so that the temperature did not exceed 120° C. After complete addition, the reaction mixture was heated up to 140° C. and stirred at that temperature until the epoxide was completely reacted (controlled by the means of NMR). Then the lactone Sm (abbreviation in the table "component S") was slowly added and the mixture was stirred at 140° C. until the content of non-volatile components was >98% (measured according to ISO 3251).

TABLE 7

| Intermediate products prepared according to the method 7 | | | | | | | | |
|---|---|---|---|---|---|---|---|---|
| Intermedio | component Y-X1 | wt % Y-X1 | component S | wt % S | component E1-1 | wt % E1-1 | catalyst | wt % catalyst |
| Y-X1-W25* | MPEG 500 | 48.53 | CAPA | 32.58 | 2-EHGE | 17.89 | $AlCl_3$/DBN | 0.85/0.15 |
| Y-X1-W26* | MPEG 500 | 17.19 | CAPA | 69.19 | 2-EHGE | 12.66 | $AlCl_3$/DBN | 0.81/0.15 |
| Y-X1-W27* | MPEG 350 | 20.17 | CAPA | 46.24 | 2-EHGE | 32.63 | $AlCl_3$/DBN | 0.81/0.15 |

MPEG (number) = methoxy polyethylene glycol (molecular weight),
CAPA = ε-Caprolactone,
2-EHGE = 2-ethylhexyl glycidyl ether,
DBN = 1,5-Diazabicyclo(4.3.0)non-5-ene,
$AlCl_3$ = aluminum trichloride Preparation Method 8

A clean dry four-necked flask (500 mL) equipped with condenser, KPG-stirrer, temperature sensor and a nitrogen line was charged with the epoxide Em (abbreviation in the table "component E1-1") and heated up to 80° C. Then a polyamine $Y(—X—H)_q$ (abbreviation in the table "component Y—X2") was slowly added into this mixture. After complete addition the temperature was increased up to 140° C. and the mixture was stirred for 2 h. Then the reaction mixture was cooled down to 40° C., the catalysts were added and the temperature was increased up to 140° C. The reaction mixture was stirred at this temperature until the epoxide was completely reacted (controlled by the means of NMR). Then the lactone (abbreviation in the table "component S") was slowly added at 140° C. The implementation of epoxide and the lactone monomers was determined by the means of NMR.

TABLE 8

| Intermediate products prepared according to the method 8 | | | | | | | | |
|---|---|---|---|---|---|---|---|---|
| Intermedio | component Y-X2 | wt. % Y-X2 | component S | wt. % S | component T1-1 | wt. % E1-1 | catalyst | wt. % catalyst |
| Y-X2-W15* | PEI300 | 3.72 | CAPA | 55.88 | 2-EHGE | 39.45 | $AlCl_3$/DBN | 0.80/0.15 |
| Y-X2-W16* | PEI300 | 1.23 | CAPA | 53.60 | 2-EHGE | 44.22 | $AlCl_3$/DBN | 0.80/0.15 |

PEI (number) = polyethylenimine (molecular weight),
CAPA = ε-Caprolactone,
2-EHGE = 2-ethylhexyl glycidyl ether,
DBN = 1,5-Diazabicyclo(4.3.0)non-5-ene,
$AlCl_3$ = aluminum trichloride Preparation of the Acid Functional Compounds $Y(—X—W—(Z)_c)_q$: Second Step Preparation method 9

A clean dry four-necked flask (250 mL) with condenser, KPG-stirrer, temperature sensor and a nitrogen line was charged with component $Y(—X—W—(H)_c)_q$ (abbreviation in the table "component Y—X1—W") and heated up to 50° C. Then the polyphosphoric acid (abbreviation in the table "component Z1") was slowly added to the mixture. After complete addition, the mixture was heated up to 80° C. and stirred 4 h at this temperature. The degree of completion was controlled by measurement of the acid number.

TABLE 9

| Products prepared according to the method 9 | | | | |
|---|---|---|---|---|
| product | component Y-X1-W | wt. % | component Z1 | wt. % Z1 |
| Y-X1-W25-Z1* | Y-X1-W25 | 90.34 | PPS | 9.66 |
| Y-X1-W26-Z1* | Y-X1-W26 | 96.37 | PPS | 3.63 |
| Y-X1-W27-Z1* | Y-X1-W27 | 93.90 | PPS | 6.10 |

PPS = polyphosphoric acid 85% available from Merck KGaA

Preparation Method 10

A clean dry four-necked flask (250 mL) with condenser, KPG-stirrer, temperature sensor and a nitrogen line was charged with component $Y(—X—W—(H)_c)_q$ (abbreviation in the table "component Y—X2—W") and an anhydride (abbreviation in the table "component Z2"). The mixture was heated up to 110° C. and stirred at this temperature until the anhydride acid number reached 0-3 mg KOH/g.

TABLE 10

| Products prepared according to the method 10 | | | | |
|---|---|---|---|---|
| product | component Y-X2-W | wt % Y-X2-W | component Z2 | wt % Z2 |
| Y-X2-W15-Z2* | Y-X2-W15 | 95.21 | BSA | 4.79 |
| Y-X2-W16-Z2* | Y-X2-W16 | 96.57 | BSA | 3.43 |

BSA = succinic anhydride

Application Examples

TABLE 11

| Overview of the products used for the application tests | | | | |
|---|---|---|---|---|
| product | component Y-X1 | component S | component E1-1 | component Z1 |
| Y-X1-W10-Z1 | 1.00 | 3.00 | 1.00 | 0.33 |
| Y-X1-W25-Z1* | 1.00 | 3.00 | 1.00 | 0.33 |
| product | component Y-X2 | component S | component E1-1 | component Z2 |
| Y-X2-W01-Z2 | 1.00 | 7.00 | 3.00 | 0.68 |
| Y-X2-W02-Z2 | 1.00 | 20.00 | 10.00 | 1.45 |
| Y-X2-W15-Z2* | 1.00 | 7.00 | 3.00 | 0.68 |
| Y-X2-W16-Z2* | 1.00 | 20.00 | 10.00 | 1.45 |

The data (number values) in the table inform about the ratio of raw materials in the corresponding acid derivate. Samples marked with (*) are block polymers (comparative examples). Compared are: Y—X1—W10—Z1 with Y—X1—W25—Z1*, Y—X2—W02—Z2 with Y—X2—W16—Z2* and Y—X2—W01—Z2 with Y—X2—W15—Z2*. By the means of DSC measurement (explained above) it is possible to distinguish between the block polymers (*) and the corresponding random types: the DSC plot of the block structures (Y—X1—W25613 Z1*, Y—X2—W16—Z2*, Y—X2—W15—Z2*) showed more narrow (not so broad) melting-/crystallization-peaks compared with the plot of the corresponding random structures (Y—X1—W10—Z1, Y—X2—W02—Z2, Y—X2—W01—Z2). Furthermore, the crystallization temperature of said block structures is higher than of corresponding random structures (s. table 12).

TABLE 12

| Crystallization temperatures of tested samples | |
|---|---|
| Sample | Crystallization Temperatures in ° C. |
| Y-X1-W10-Z1 | −25 |
| Y-X1-W25-Z1* | −14 |
| Y-X2-W01-Z2 | 2 |
| Y-X2-W15-Z2* | 5 |
| Y-X2-W02-Z2 | 9 |
| Y-X2-W16-Z2* | 11 |

Application Example 1

Raw Materials used for the Application Tests:

Setal 189 XX65-Polyester resin purchased from Allnex/Nuplex

Sicotrans Red L2817-transparent iron oxide purchased from BASF

Working Method 1

Preparation of Millbase

Variation of parameters such as pigment/binder-ratio and additive dosage in the millbase formulation has a tremendous influence on the quality of the pigment dispersion and stabilization. The amount of resin could have an influence on flow behavior/viscosity, pigment wetting, storage stability of millbase and final paint for example. Only if there is an optimal amount of wetting & dispersing-additive available in the grinding phase the best pigment dispersion can be achieved. Consequently, for test purpose the system can be adjusted more or less "sensitive" by variation of parameters. In order to get a satisfactory differentiation of the tested additives, the pigment dispersions were prepared with different amounts of wetting & dispersing additives (s. table 13).

TABLE 13

| Formulation of millbase | | |
|---|---|---|
| Type of the formulation | additive dosage (solid on pigment) in % | Pigment/binder-ratio (solid on solids) |
| Type 1 | 25 | 1:1.2 |
| Type 2 | 15 | 1:1.2 |

The detailed composition of the formulation is described in the table 14.

TABLE 14

| Composition of the formulation | | | | | |
|---|---|---|---|---|---|
| | | Type : | | | |
| | | 1 | | 2 | |
| Position | Millbase | Control | 25% | Control | 15% |
| 1 | Setal 189 XX-65 | 25.0 | 19.7 | 25.0 | 21.8 |
| 2 | W&D-additive | — | 6.5 | — | 3.9 |
| 3 | Butyl acetate | 15.4 | 10.3 | 14.5 | 10.8 |
| 4 | Sicotrans Red L2817 | 13.5 | 13.5 | 13.5 | 13.5 |
| | Sum of 1-4 | 50.0 | 50.0 | 50.0 | 50.0 |
| 5 | Glass beads 1 mm | 50.0 | 50.0 | 50.0 | 50.0 |
| Pigment/binder-ratio: | | 1/1.2 | | 1/1.2 | |
| Additive dosage: (solid on pigment) | | 0% | 25% | 0% | 15% |

For the preparation of the millbase a binder, a wetting and dispersing additive and a solvent (positions 1-3) were filled in a glass bottle (100 ml) and homogenized with a spatula. After this procedure the pigment and glass beads were added to the mixture and dispersed by high speed shaker (Disperser DAS A 200-K with cooling system—SYSTEM LAU) for 120 minutes at a maximum energy input (stage 3=100% power) using a teflon disk (4,5 cm ). After that, the glass beads were removed by filtration (using 240 μm paper filter).

Judgement of Millbase Viscosity

The millbase viscosity can give a hint on the efficiency/quality of pigment dispersion. Therefor the viscosity of the millbases was measured after one day storage at room temperature (RT), three days storage at room temperature (RT). The following equipment and parameters were used to judge the viscosity of the samples: Rheologica Stresstech (rotational rheometer, cone/plate), Cone (25mm/1°), shear rate 0-1000 (1/s), at 23° C. (according to DIN EN ISO 2884-1).

RESULTS

The results of the application tests are presented below (in the tables 15-16).

TABLE 15

Results of viscosity measurement in Type 1 formulation

| | Type 1 | | | |
|---|---|---|---|---|
| Shear rate 1/s | 1 d RT Y-X1-W10-Z1 Viscosity mPa s | 1 d RT Y-X1-W25-Z1* Viscosity mPa s | 3 d RT Y-X1-W10-Z1 Viscosity mPa s | 3 d RT Y-X1-W25-Z1* Viscosity mPa s |
| 1 | 184 | 186 | 223 | 256 |
| 2 | 170 | 178 | 197 | 255 |
| 5 | 159 | 176 | 197 | 243 |
| 10 | 146 | 169 | 184 | 237 |
| 20 | 142 | 165 | 179 | 223 |
| 50 | 135 | 155 | 168 | 203 |
| 100 | 128 | 147 | 160 | 198 |
| 200 | 119 | 138 | 149 | 192 |
| 500 | 107 | 123 | 134 | 164 |
| 1000 | 100 | 114 | 126 | 153 |

TABLE 16

Results of viscosity measurement in Type 2 formulation

| | Type 2 | | | |
|---|---|---|---|---|
| Shear rate 1/s | 1 d RT Y-X1-W10-Z1 Viscosity mPa s | 1 d RT Y-X1-W25-Z1* Viscosity mPa s | 3 d RT Y-X1-W10-Z1 Viscosity mPa s | 3 d RT Y-X1-W25-Z1* Viscosity mPa s |
| 1 | 3821 | 5742 | 298 | 339 |
| 2 | 2156 | 3569 | 265 | 311 |
| 5 | 1463 | 1799 | 240 | 278 |
| 10 | 814 | 1556 | 218 | 272 |
| 20 | 689 | 1360 | 208 | 260 |
| 50 | 258 | 1234 | 201 | 233 |
| 100 | 178 | 986 | 198 | 225 |
| 200 | 164 | 853 | 195 | 211 |
| 500 | 155 | 368 | 194 | 193 |
| 1000 | 143 | 179 | 193 | 183 |

In the tested millbase variations Type 1 and Type 2 the additive Y—X1—W10—Z1 which is a statistic polymer showed normally better viscosity reduction as compared to the corresponding block structure Y—X1—W25—Z1*. Furthermore, the inventive additive Y—X1—W10—Z1 demonstrates obvious advantage in viscosity reduction at lower additive dosages (Type 2) compared to corresponding block structure Y—X1—W25—Z1*.

Application Example 2

Raw Material Used for the Application Tests

Ebecryl 4381: UV/EB Curable Resins—unsaturated polyester resin diluted in 30% dipropylene glycol diacrylate (DPGDA), purchased from Allnex Laromer DPGDA: Dipropylene glycol diacrylate, purchased from BASF Irgacure 1173: 2-Hydroxy-2-methyl-1-phenyl-propan-1-one used in reactive and radiation curing adhesives, purchased from IGM ACEMATT HK 440: Untreated silica-based matting agent, purchased from Evonik BYK-088: Defoamer for solvent-borne systems, purchased from BYK Chemie GmbH BYK-306: Silicone-containing surface additive for ambient-curing plastic systems and solvent-borne coating systems, purchased from BYK Chemie GmbH BYK-350: An acrylic leveling additive for solvent-borne and solvent-free systems, purchased from BYK Chemie GmbH Working Method 2

Preparation of UV Matt Base

In order to achieve a high quality UV matt base, a sufficient wetting and dispersing of the matting agent is important. The following properties indicate the effect of the additives used: gloss reduction (preferable low gloss), surface appearance (preferable smooth and fine) and paint viscosity (preferable low/flowable).

The detailed composition of the formulation is presented in the table 17.

TABLE 17

Composition of the formulation

| Position | Raw Materials | Composition |
|---|---|---|
| 1 | Ebecryl 4381 | 18.1 |
| 2 | Laromer DPGDA | 27.9 |
| 3 | Irgacure 1173 | 3.1 |
| 4 | BYK-088 | 0.2 |
| 5 | BYK-306 | 0.1 |
| 6 | BYK-350 | 0.1 |
| 7 | W&D-Additive | 1.5 |
| 8 | ACEMATT HK 440 | 9.0 |
| 9 | PMA | 40.0 |
| total | | 100.0 |

For the preparation of the UV matt base raw materials listed in the position 1-3 were mixed shortly by dissolver (1865 rpm), then the additives listed in the positions 4-6 were added to this mixture and stirred for another 3 minutes at 1865 rpm. After that the W&D additive (position 7) and the solvent (PMA=1-methoxy-2-propylacetate) were added to the mixture under stirring. Finally, a matting agent (position 8) was added and the whole mixture stirred for 10 minutes at 1865 rpm.

The final paints were applied on black PMMA (poly methyl methacrylate) panels and cured using mercury UV lamp from IST Metz GmbH (speed 5 m/min, 100% intensity).

Matting Effect (Measurement of Gloss Reduction)

Gloss Measurement at 20°/60°/85° with Micro tri Gloss (BYK-Gardner).

The results of the application tests are presented below (in the tables 18-19).

TABLE 18

Results of the gloss measurement

| Gloss (angle) | Gloss 20° | Gloss 60° | Gloss 85° |
|---|---|---|---|
| Y-X2-W16-Z2* | 0.2 | 2.5 | 39.5 |
| Y-X2-W02-Z2 | 0.1 | 1.9 | 37.3 |
| Y-X2-W15-Z2* | 0.3 | 3.3 | 41.9 |
| Y-X2-W01-Z2 | 0.2 | 2.1 | 36.8 |

TABLE 19

Results of the viscosity measurement

| | sample | | | |
|---|---|---|---|---|
| Shear rate 1/s | Y-X2-W16-Z2* Viscosity mPa s | Y-X2-W02-Z2 Viscosity mPa s | Y-X2-W15-Z2* Viscosity mPa s | Y-X2-W01-Z2 Viscosity mPa s |
| 1 | 63718 | 50500 | 92123 | 52560 |
| 10 | 9897 | 8862 | 9142 | 7265 |
| 100 | 1918 | 1892 | 1786 | 1586 |

In the tested paint system the additives Y—X2—W02—Z2 and Y—X2—W01—Z2 based on statistical polymers lead to better matting properties and better viscosity reduction in comparison to corresponding block copolymer Y—X2—W16—Z2* and Y—X2—W15—Z2*. This shows the high dispersing quality of the acid functional compounds according to the present invention.

The invention claimed is:

1. An acid functional compound comprising i. at least one segment comprising at least one ether unit and at least one ester unit, wherein the at least one ether unit and the at least one ester unit are connected by an ether link or by an ester link, and wherein the sum of the number of the at least one ether unit and the at least one ester unit is at least three, and wherein the at least one ether unit and the at least one ester unit are arranged in random order, and ii. at least one acidic group selected from a phosphoric acid group, an acidic phosphoric acid ester group, a sulfonic acid group, an acidic sulfonic acid ester group and a carboxylic acid group, wherein the at least one acidic group is covalently linked to the at least one segment, wherein the acid functional compound functions as a wetting agent.

2. The acid functional compound according to claim 1, wherein the at least one segment is defined by the largest portion between two ester links, and wherein the at least one segment comprises an average number of ether links L between two adjacent ether units and an average number of ether units E, wherein a ratio R is defined according to formula (A): L/(E-1) and wherein, when E is larger than 1.0, R is smaller than 1.0.

3. The acid functional compound according to claim 2, wherein the ratio R is smaller than 0.9.

4. The acid functional compound according to claim 1, wherein the at least one segment is linked to a polymerization starter moiety comprising an amine group selected from a tertiary amine group, a salt of a tertiary amine group and a quaternary ammonium group.

5. The acid functional compound according to claim 4, wherein the polymerization starter moiety is directly linked to said at least one segment via a group selected from an ether group, an ester group, a secondary amide group, a tertiary amide group, a secondary amine group and a tertiary amine group.

6. The acid functional compound according to claim 4, wherein the polymerization starter moiety is a polyethylenimine.

7. The acid functional compound according to claim 1, wherein the at least one ether unit includes a unit of formula (III) $—[CR^{30}_2]_n—O—$, wherein n is an integer of 2 or 3, and $R^{30}$ independent of each other represent organic groups having 1 to 25 carbon atoms or hydrogen.

8. The acid functional compound according to claim 7, wherein, in case n is equal to 2, at least one of the $R^{30}$ represents an ether group having the formula $—R^{31}—O—R^{32}$, wherein $R^{31}$ and $R^{32}$ independent of each other represent organic groups having 1 to 30 carbon atoms.

9. The acid functional compound according to claim 1, wherein the acid functional compound has the general formula:

$$Y(—X—W—Z)_q \text{ (Ia)},$$

wherein Y is represented by an organic group containing 1-500 carbon atoms, X is represented by O, NH and/or $NR^1$, $R^1$ is independently selected and is represented by a chemical bond to a carbon atom of Y and/or an independently selected organic group containing 1-20 carbon atoms, W is one segment of the at least one segment i., q=1-100, and each Z is independently selected from hydrogen and moiety Z-a, each other each moiety Z-a is independently selected from an organic group containing 0-600 carbon atoms and at least one acidic group ii., wherein at least one Z is represented by moiety Z-a.

10. The acid functional compound according to claim 9, characterized in that each moiety Z-a is independently represented by general formula (II)

$$\sim PO(V)_n(OH)_{2-n} \quad \text{(II)}$$

with each V independently represented by a chemical bond to an oxygen atom of the same molecule and/or a group $OR^{33}$, each $R^{33}$ independently represented by an organic group containing 1 to 500 carbon atoms, and n is 0 or 1.

11. The acid functional compound according to claim 10, characterized in that n=0.

12. The acid functional compound according to claim 1 that is present in salinized or partially salinized form.

13. A composition comprising particles and an acid functional compound according to claim 1.

14. A method for producing an acid functional compound, the method comprising:

preparing a segment by reacting a cyclic ester and a cyclic ether together in a ring-opening polymerization reaction, wherein the ring-opening polymerization reaction is started by a polymerization starter compound comprising at least one functional group selected from a hydroxyl group, a secondary amine group and a primary amine group, and converting the segment of with an agent to covalently link the segment to at least one acidic group selected from a phosphoric acid group, an acidic phosphoric acid ester group, a sulfonic acid group, an acidic sulfonic acid ester group, and a carboxylic acid group, the method yielding an acid functional compound comprising i. at least one segment comprising at least one ether unit and at least one ester unit, wherein the at least one ether unit and the at least one ester unit are connected by an ether link or by an ester link, and wherein the sum of the number of the at least one ether unit and the at least one ester unit is at least three, and wherein the at least one ether unit and the at least one ester unit-are arranged in random order, and ii. at least one acidic group selected from a phosphoric acid group, an acidic phosphoric acid ester group, a sulfonic acid group, an acidic sulfonic acid ester group and a carboxylic acid group, wherein the at least one acidic group is covalently linked to the at least one segment.

15. The method according to claim 14, wherein the cyclic ester and the cyclic ether are added substantially simultaneously into a reaction mixture, which is maintained in reaction conditions.

16. The method according to claim 14, wherein the polymerization starter compound is added to a reaction mixture containing the cyclic ester and the cyclic ether, which reaction mixture is maintained in reaction conditions.

17. The acid functional compound according to claim 2, wherein the ratio R is smaller than 0.8.

18. The acid functional compound according to claim 2, wherein the ratio R is smaller than 0.7.

19. The acid functional compound according to claim 10, wherein each $R^{33}$ independently represents an organic group containing 1 to 35 carbon atoms.

* * * * *